US006968374B2

(12) United States Patent
Lemieux et al.

(10) Patent No.: US 6,968,374 B2
(45) Date of Patent: Nov. 22, 2005

(54) QUALITY OF SERVICE (QOS) MECHANISM IN AN INTERNET PROTOCOL (IP) NETWORK

(75) Inventors: Yves Lemieux, Kirkland (CA); Mohamed Ashour, Montreal (CA); Tallal Elshabrawy, Montreal (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 664 days.

(21) Appl. No.: 10/187,796

(22) Filed: Jul. 3, 2002

(65) Prior Publication Data

US 2004/0006613 A1    Jan. 8, 2004

(51) Int. Cl.$^7$ ............................................. G06F 15/16

(52) U.S. Cl. ..................................................... 709/223

(58) Field of Search ................................. 709/223, 238

(56) References Cited

U.S. PATENT DOCUMENTS

| | | | | | |
|---|---|---|---|---|---|
| 5,724,513 | A | * | 3/1998 | Ben-Nun et al. | 709/234 |
| 5,832,197 | A | * | 11/1998 | Houji | 714/4 |
| 6,038,214 | A | * | 3/2000 | Shionozaki | 370/230 |
| 6,452,942 | B1 | * | 9/2002 | Lemieux | 370/468 |
| 6,477,582 | B1 | * | 11/2002 | Luo et al. | 709/241 |
| 6,490,252 | B1 | * | 12/2002 | Riggan et al. | 370/237 |
| 6,725,456 | B1 | * | 4/2004 | Bruno et al. | 718/102 |
| 6,760,336 | B1 | * | 7/2004 | Mangin et al. | 370/395.21 |

FOREIGN PATENT DOCUMENTS

| EP | 1024642 | 2/0000 |
|---|---|---|
| WO | WO 00/30307 | 5/2000 |

OTHER PUBLICATIONS

J. Heinanen et al., *Assured Forwarding PHB Group*, Network Working Group, RFC 2597, Jun. 1999.
V. Jacobson et al., *An Expedited Forwarding PHB*, Network Working Group, RFC 2598, Jun. 1999.
S. Blake et al., *An Architecture for Differentiated Services*, Network Woorking Group, RFC 2475, Dec. 1998.
S. Ganti et al., *MPLS Support of Differentiated Services Using E-LSP*, Internet Draft, draft-ganti-mpls-diffserv-elsp-01.txt, Nov. 2001.
R. Braden et al., *Resource ReSerVation Protocol (RSVP)*, Network Working Group, RFC 2205, Sep. 1997.
E. Rosen et al., *Multiprotocol Label Switching Architecture*, Network Working Group, RFC 3031, Jan. 2001.

(Continued)

*Primary Examiner*—David Y. Eng
(74) *Attorney, Agent, or Firm*—Sandra Beauchesne; Ericsson Canada Inc.

(57) ABSTRACT

The present invention provides a network node and corresponding methods for implementing a Quality of Service (QoS) mechanism in an Internet Protocol (IP) network. The network node comprises a swapping table comprising swapping records. Each swapping record lists an incoming network path and an associated QoS Class, an outgoing network path associated with the incoming network path. Each swapping records also lists a second QoS Class and an output port of the network node associated with the outgoing network path. The network node also comprises a communication module capable of receiving packet flows on one of the incoming network paths and directing the packets from the packet flows into packet queues each having an associated QoS classification corresponding to the QoS Class of the outgoing network path associated with the incoming network path on which the packets have been received, and as listed in the swapping table.

39 Claims, 20 Drawing Sheets

OTHER PUBLICATIONS

Daniel O. Awduche et al., *RSVP-TE: Extension to RSVP for LSP Tunnels*, Network Working Group, Internet Draft, draft-ietf-mpls-rsvp-lsp-tunnel-09.txt, Aug. 2001.

Francois Le Faucheur et al., *MPLS Support of Differentiated Services*, IETF Internet Draft, draft-ietf-mpls-diff-ext-09.txt, Apr. 2001.

Bilel Jamoussi et al., *Constraint-Based LSP Setup Using LDP*, MPLS Working Group, Internet Draft, draft-ietf-mpls-cr-ldp-06.txt, Nov. 2001.

L. Andersson et al., *LDP Specification*, Network Working Group, RFC 3036, Jan. 2001.

* cited by examiner

| Packet flow | End-to-end delay requirement (ms) |
|---|---|
| Packet flow 430A | 35 |
| Packet low 430B | 37 |
| Packet flow 430C | 32 |

Figure 5

| QoS Classes | Routing Delay | Router 420A delay (ms) | Router 420B delay (ms) | Router 420C delay (ms) |
|---|---|---|---|---|
| Class 1 440A | D1 450A | 5 | 5 | 5 |
| Class 2 440B | D3 450B | 10 | 10 | 10 |
| Class 3 440C | D3 450C | 15 | 15 | 15 |

Figure 6

| Packet Flow | Network path 410A | | | Maximum end-to-end delay (ms) |
|---|---|---|---|---|
| | Router 420A | Router 420B | Router 420C | |
| Packet Flow 430C | QoS Class 1 440A router delay 5 ms | QoS Class 1 440A router delay 5 ms | QoS Class 1 440A router delay 5 ms | 15 |
| | | | QoS Class 2 440B router delay 10 ms | 20 |
| | | | QoS Class 3 440C router delay 15 ms | 25 |
| | | QoS Class 2 440B router delay 10 ms | QoS Class 1 440A | 20 |
| | | | QoS Class 2 440B | 25 |
| | | | QoS Class 3 440C | 30 |
| | | QoS Class 3 440C router delay 15 ms | QoS Class 1 440A | 25 |
| | | | QoS Class 2 440B | 30 |
| | | | QoS Class 3 440C | 35 |
| | QoS Class 2 440B router delay 10 ms | QoS Class 1 440A | QoS Class 1 440A | 20 |
| | | | QoS Class 2 440B | 25 |
| | | | QoS Class 3 440C | 30 |
| | | QoS Class 2 440B | QoS Class 1 440A | 25 |
| | | | QoS Class 2 440B | 30 |
| | | | QoS Class 3 440C | 35 |
| | | QoS Class 3 440C | QoS Class 1 440A | 25 |
| | | | QoS Class 2 440B | 30 |
| | | | QoS Class 3 440C | 35 |
| | QoS Class 3 440C router delay 15 ms | QoS Class 1 440A | QoS Class 1 440A | 25 |
| | | | QoS Class 2 440B | 30 |
| | | | QoS Class 3 440C | 35 |
| | | QoS Class 2 440B | QoS Class 1 440A | 30 |
| | | | QoS Class 2 440B | 35 |
| | | | QoS Class 3 440C | 40 |
| | | QoS Class 3 440C | QoS Class 1 440A | 35 |
| | | | QoS Class 2 440B | 40 |
| | | | QoS Class 3 440C | 45 |

Figure 7

| Routing table of the entry node 820 | | | | | | | | |
|---|---|---|---|---|---|---|---|---|
| Target Node | Least Cost on QoS Class 1 440A | | Least Cost on QoS Class 2 440B | | Least Cost on QoS Class 3 440C | | Least Delay | |
| | Next node | Value | Next node | Value | Next node | Value | Next node | Value (ms) |
| Router 825 | Router 825 | 7 | Router 825 | 5 | Router 825 | 2 | Router 825 | 5 |
| Router 835 | Router 835 | 8 | Router 835 | 4 | Router 835 | 1 | Router 835 | 5 |
| Router 845 | Router 835 | 16 | Router 835 | 8 | Router 835 | 2 | Router 835 | 10 |
| Exit Node 830 | Router 825 | 14 | Router 825 | 8 | Router 835 | 3 | Router 825 | 10 |

Figure 11A

| Port table of the entry node 820 | | | | |
|---|---|---|---|---|
| Port | Target Node | QoS Class 440 | Cost | Delay (ms) |
| 1 | Router 825 | Class 1 440A | 7 | 5 |
| 1 | Router 825 | Class 2 440B | 5 | 10 |
| 1 | Router 825 | Class 3 440C | 2 | 15 |
| 2 | Router 835 | Class 1 440A | 8 | 5 |
| 2 | Router 835 | Class 2 440B | 4 | 10 |
| 2 | Router 835 | Class 3 440C | 1 | 15 |

Figure 11B

| Swapping table of the entry node 820 | | | | |
|---|---|---|---|---|
| IN | | OUT | | Port |
| Incoming Path | QoS Class 440 | Outgoing Path | QoS Class 440 | |
| 33 | Class 2 440B | 850 | Class 1 440A | 3 |
| | | | | |
| | | | | |
| | | | | |

Figure 11C

| Routing table of the router 825 |||||||||
|---|---|---|---|---|---|---|---|---|
| Target Node | Least Cost on QoS Class 1 440A || Least Cost on QoS Class 2 440B || Least Cost on QoS Class 3 440C || Least Delay ||
| | Next node | Value | Next node | Value | Next node | Value | Next node | Value (ms) |
| Entry Node 820 | Entry Node 820 | 7 | Entry Node 820 | 5 | Entry Node 820 | 2 | Entry Node 820 | 5 |
| Router 835 | Entry Node 820 | 15 | Entry Node 820 | 9 | Entry Node 820 | 3 | Entry Node 820 | 10 |
| Router 845 | Exit Node 830 | 15 | Exit Node 830 | 9 | Exit Node 830 | 5 | Exit Node 830 | 10 |
| Exit Node 830 | Exit Node 830 | 7 | Exit Node 830 | 5 | Exit Node 830 | 2 | Exit Node 830 | 10 |

Figure 11D

| Port table of the router 825 |||||
|---|---|---|---|---|
| Port | Target Node | QoS Class 440 | Cost | Delay (ms) |
| 1 | Exit Node 830 | Class 1 440A | 7 | 5 |
| 1 | Exit Node 830 | Class 2 440B | 5 | 10 |
| 1 | Exit Node 830 | Class 3 440C | 2 | 15 |
| 2 | Entry Node 820 | Class 1 440A | 7 | 5 |
| 2 | Entry Node 820 | Class 2 440B | 5 | 10 |
| 2 | Entry Node 820 | Class 3 440C | 2 | 15 |

Figure 11E

| Swapping table of the router 825 |||||
|---|---|---|---|---|
| IN || OUT || Port |
| Incoming Path | QoS Class 440 | Outgoing Path | QoS Class 440 | |
| 850 | Class 1 440A | 852 | Class 3 440C | 1 |
| 850 | Class 2 440B | 852 | Class 2 440B | 1 |
| 30 | Class 1 440A | 32 | Class 3 440C | 2 |
| | | | | |
| | | | | |
| | | | | |

Figure 11F

| Routing table of the router 835 | | | | | | | | |
|---|---|---|---|---|---|---|---|---|
| Target Node | Least Cost on QoS Class 1 440A | | Least Cost on QoS Class 2 440B | | Least Cost on QoS Class 3 440C | | Least Delay | |
| | Next node | Value | Next node | Value | Next node | Value | Next node | Value (ms) |
| Router 825 | Entry Node 820 | 7 | Entry Node 820 | 3 | Entry Node 820 | 2 | Entry Node 820 | 10 |
| Entry Node 820 | Entry Node 820 | 8 | Entry Node 820 | 4 | Entry Node 820 | 1 | Entry Node 820 | 5 |
| Router 845 | Router 845 | 8 | Router 845 | 4 | Router 845 | 1 | Router 835 | 2 |
| Exit Node 830 | Router 845 | 16 | Router 845 | 8 | Router 845 | 2 | Router 845 | 10 |

Figure 11G

| Port table of the router 835 | | | | |
|---|---|---|---|---|
| Port | Target Node | QoS Class 440 | Cost | Delay (ms) |
| 1 | Entry Node 820 | Class 1 440A | 8 | 5 |
| 1 | Entry Node 820 | Class 2 440B | 4 | 10 |
| 1 | Entry Node 820 | Class 3 440C | 1 | 15 |
| 2 | Router 845 | Class 1 440A | 8 | 5 |
| 2 | Router 845 | Class 2 440B | 4 | 10 |
| 2 | Router 8435 | Class 3 440C | 1 | 15 |

Figure 11H

| Swapping table of the router 835 | | | | |
|---|---|---|---|---|
| IN | | OUT | | Port |
| Incoming Path | QoS Class 440 | Outgoing Path | QoS Class 440 | |
| 854 | Class 1 440A | 856 | Class 3 440C | 1 |
| 31 | Class 3 440C | 35 | Class 1 440A | 2 |
| | | | | |
| | | | | |
| | | | | |

Figure 11J

| Information_request | | | |
|---|---|---|---|
| Source | Node 1 | Requested Info | Target |

Figure 12 A

| Information_reply | | | | | | | | |
|---|---|---|---|---|---|---|---|---|
| Target | Next node LC QoS class 1 440A | LC QoS class 1 440A | Next node LC QoS class 2 440B | LC QoS class 2 440B | Next node LC QoS class 3 440C | LC QoS class 3 440C | Next node LD | LD |

Figure 12 B

| Status_request | | |
|---|---|---|
| Addresses | Action | Value |
| | | |

Figure 13A

| Class_assignment | | |
|---|---|---|
| Addresses | Action | Value |
| | | |

Figure 13B

| Explicit_request | | |
|---|---|---|
| Entry Node's Address | Request | Cost |

Figure 13C

Network Node

Routing table

| Target Node | Least Cost on QoS Class 1 440A | | Least Cost on QoS Class 2 440B | | Least Cost on QoS Class 3 440C | | Least Delay | |
|---|---|---|---|---|---|---|---|---|
| | Next node | Value | Next node | Value | Next node | Value | Next node | Value (ms) |
| Router 825 | Entry Node 820 | 7 | Entry Node 820 | 3 | Entry Node 820 | 2 | Entry Node 820 | 10 |
| Entry Node 820 | Entry Node 820 | 8 | Entry Node 820 | 4 | Entry Node 820 | 1 | Entry Node 820 | 5 |
| Router 845 | Router 845 | 8 | Router 845 | 4 | Router 845 | 1 | Router 835 | 2 |
| Exit Node 830 | Router 845 | 16 | Router 845 | 8 | Router 845 | 2 | Router 845 | 10 |

Port table

| Port | Target Node | QoS Class 440 | Cost | Delay (ms) |
|---|---|---|---|---|
| 1 | Entry Node 820 | Class 1 440A | 8 | 5 |
| 1 | Entry Node 820 | Class 2 440B | 4 | 10 |
| 1 | Entry Node 820 | Class 3 440C | 1 | 15 |
| 2 | Router 845 | Class 1 440A | 8 | 5 |
| 2 | Router 845 | Class 2 440B | 4 | 10 |
| 2 | Router 8435 | Class 3 440C | 1 | 15 |

Swapping table

| IN | | OUT | | Output Port |
|---|---|---|---|---|
| Incoming Path | QoS Class 440 | Outgoing Path | QoS Class 440 | |
| 11 | Class 1 440A | 32 | Class 3 440C | 1 |
| 12 | Class 2 440B | 31 | Class 2 440B | 1 |
| 13 | Class 3 440C | 30 | Class 1 440A | 1 |
| 24 | Class 1 440A | 1 | Class 2 440B | 2 |
| 25 | Class 2 440B | 3 | Class 3 440C | 2 |
| 26 | Class 3 440C | 5 | Class 1 440A | 2 |

Quality Module — 1510

Communicating Module — 1512

Forwarding Module — 1514

Packet queues — 1516

| | | x | x | x | x | x | x | x | Q1 |
| | | | | | | | | | Q2 |
| x | x | x | x | x | x | x | x | x | Q3 |
| | | | | | | x | x | x | x | Q4 |
| | | | | | | x | x | x | x | Q5 |
| | | | | | | | | x | Q6 |

Figure 15

QUALITY OF SERVICE (QOS) MECHANISM IN AN INTERNET PROTOCOL (IP) NETWORK

BACKGROUND OF THE INVENTION

1. Field of the Invention

The present invention relates to a Quality of Service (QoS) mechanism in an Internet Protocol (IP) network and to a method therefore.

2. Description of the Related Art

For many years, Internet had been built as a "best effort" network. In other words, no Quality of Service (QoS) was implemented in the network. More recently, QoS has become a need with the convergence of technology toward the use of Internet and its Internet Protocol (IP). Essentially, QoS aims at improving the performance of the network. In order to do so, a QoS mechanism applies a set of parameters to the traffic on the network. These parameters are linked to characteristics of the network that can be managed. Examples of such parameters include the allocated bandwidth, the delay of a network link, the end-to-end delay of a transmission, the delay-jitter or delay variation and the data loss probability. The QoS mechanism also enables subdivision of all available resources into a plurality of sub links with different levels of quality. Examples of available resources are the bandwidth of a given link or the processing power of a given node. This subdivision into the plurality pf sub links is particularly useful when different types of traffic travel on the same network. For example, downloading advertisement from the Internet may not request the same priority as live conferencing for an emergency surgery.

The efficiency of the QoS mechanism increases with the number of parameters that can be set on each one of the plurality of sub links. The measurement of the efficiency is done by a set of metrics mapped on the parameters. The QoS mechanism, which adds an overhead on the network, is always a compromise between the need for subdivision and control of the resources and the need for performance.

A few solutions were put forward in order to provide packet-switched IP networks with QoS. Examples of such solutions are Integrated Services (Int-Serv), Differentiated Services (Diff-Serv) and Multiple Protocol Label Switching (MPLS).

Reference is now to FIG. 1, which shows a signal flow chart of an Int-Serv path according to prior art. The Int-Serv architecture envisions per-flow resources reservations with the use of pre-determined paths in an IP network 100. It achieves that through Resource Reservation Protocol (RSVP) signaling [RFC 2205]. In that scenario, an entry node 110, handling a service flow with certain QoS restrictions, uses an RSVP PATH message 150 to request a path of resources from all intermediate nodes or routers 120 and 130 towards its projected destination. As an exit node 140 receives PATH message 154, it initiates a RESERVE message 160 that reserves the admitted path of resources across the nodes 120 and 130 that the PATH message 150, 152 and 154 traversed from the entry node 110 to the exit node 140. Subsequent traffic forwarding therefore should experience requested QoS guarantees as a result of resource reservation over the deterministic path.

However, as it is expected for the Internet to expand tremendously, there is a concern regarding the scalability of the hit-Serv architecture. Millions and millions of microflows are expected to pass across internal Internet nodes. It becomes a huge burden for those nodes to maintain information and consistently satisfy requirements of such an enormous number of flows.

As a second solution, the Diff-Serv architecture provides simple scalable differentiated forwarding of IP traffic. Each Diff-Serv node supports a finite number of forwarding categories in the form of Per-Hop Behavior (PHB) groups [RFC 2475]. All traffic that belongs to one forwarding category is treated exactly in the same manner independently of their actual end-to-end requirements. Since internal nodes only handle a limited number of forwarding categories, the architecture is, indeed, scalable.

In order to provide QoS, Diff-Serv envisions Service Level Provisioning or Service Level Agreement (SLA) with a neighboring network. FIG. 2A is a flow chart of a reception of a packet flow in an entry node implementing Differentiated Services (Diff-Serv). As the packet flow is received 210 in the entry node of the Diff-Serv network from the neighboring network, a forwarding category becomes associated with the packet flow (step 212). The packet flow is also conditioned (step 214) to remain consistent with the neighboring network's established SLA. For instance, some packets from the packet flow may be dropped if the maximum packet rate specified in the SLA is exceeded.

As it can be appreciated, Diff-Serv drives complexity and decision making towards the edges of the network while allowing simple scalable forwarding at intermediate nodes between the entry node and the exit node. Currently three PHB groups are defined. The Expedited Forwarding (EF) [RFC 2598] PHB group provides high guarantees by allocating resources for the maximum arrival rate of the aggregate. The Assured Forwarding (AF) [RFC 2597] PHB group provides assurance for high probability forwarding without any strict delay requirements. The Default (DE) group represents the traditional Internet "best effort" traffic.

The steps taken by an internal node in order to forward the packet flow to its next destination is shown in FIG. 2B. It is to be noted that, in regular working state, a plurality of packet flows with different associated forwarding categories concurrently travel in the Diff-Serv network. In order to forward the packet flows, the internal node has three packet queues, each one having an associated PHB group (EF, AF or DE). When one packet flow is received by the internal node with a given associated forwarding category, it is stored in the corresponding queue in sequence of arrival. The internal node, concurrently to the reception of new packet flows, forwards the content of the queue by first determining if the highest quality queue (EF) is empty (step 220). If the EF queue contains at least one packet, the internal node forwards the oldest packet of the highest quality queue (EF) (step 222) and returns to step 220. If the EF queue is empty, the internal node determines if the intermediate quality queue (AF) is empty (step 224). If the AF queue contains at least one packet, the internal node forwards the oldest packet of the intermediate quality queue (AF) (step 226) and returns to step 220. If the AF queue is empty, the internal node determines if the lowest quality queue (DE) is empty (step 228). If the DE queue contains at least one packet, the internal node forwards the oldest packet of the lowest quality queue (DE) (step 230) and returns to step 220. If the DE queue is empty as well, the internal node returns to step 220 and so on.

While Diff-Serv does achieve scalable networks, there are no strict QoS guarantees. With Diff-Serv nodes forwarding aggregate traffic, per flow reservation and therefore QoS guarantees are not possible. The architecture relies on the capability of the network to adequately manage its overall resources through conditioning actions in order to satisfy the agreed SLA. However, this is a very challenging task especially for large networks that rely on traditional routing where the path of traffic might be dynamic and unknown. Moreover, combined behavior of aggregate traffic from various neighboring networks cannot be anticipated even if all of them indeed lie within the bounds of their SLA. In order for a Diff-Serv network management to satisfy all SLA, sacrifices might become necessary in terms of network utilization to protect against worst case scenarios where all neighboring networks transmit at their maximum rates.

The third solution, MPLS [RFC 3031], aims at achieving fast and simple forwarding of IP traffic. In MPLS, routing information is signaled between neighboring nodes and a group of virtual paths known as Label Switched Paths (LSP) are established between the edges of the MPLS network. FIG. 3 shows an MPLS network 300 in which a packet flow 310 approaches the MPLS network 300 from a source 320 in order to reach a destination 330. The packet flow 310 is classified or labeled (step 332) by the MPLS network's entry node 110 onto an LSP that will adequately direct the packet flow 310 towards the exit node 140 and will also forward (step 333) the packet flow 310 toward the destination 330. Each MPLS node that participates in the LSP is known as a Label Switched Router (LSR) 325. Each LSR along the LSP has an incoming and outgoing labels binding that represent the routing information at each LSR 325 and indicate the forwarding direction as well as forwarding behavior to be applied to the packet flow 310. The incoming and outgoing labels for each LSR 325 therefore act as shorthand for routing and are pre-signaled between neighboring nodes through special protocols such as Label Distribution Protocol (LDP) [RFC 3036]. LSR 325 packet flow 310 forwarding (step 334) in that scenario becomes a simple label lookup and swapping (step 336) (change incoming to outgoing labels) operations rather than best prefix match as in traditional routing. When the packet flow 310 reaches the exit node 140 of the MPLS network 300, the packet flow is unlabelled (step 338) and forwarded (step 340) toward the destination 330.

Some extensions to existing routing protocols have been proposed to enable explicit routing in MPLS networks such as traffic engineering extensions to RSVP (RSVP-TE) and Constraint Routing LDP (CR-LDP). The main goal of explicit routing is to have only one destination for each entering packet bringing the logic of path establishment to the network's edges. Packets are classified at the edge into their explicit path and do not need to carry the explicit routing information as in traditional IP networks. Those extensions fill the objective of traffic engineering to avoid over-utilizing certain paths for traffic forwarding while other paths in the network remain under-utilized While MPLS simplifies forwarding of IP data., it does not provide QoS. In fact, MPLS nodes do not take any QoS parameters into account for the forwarding of packets, but rather intepret each packet's label to forward it accordingly.

As it can be appreciated, none of the three presented solutions provides a scalable and efficient QoS mechanism for the Internet.

The present invention provides such a solution.

SUMMARY OF THE INVENTION

It is an aspect of the present invention to provide a network node for implementing a Quality of Service (QoS) mechanism in an Internet Protocol (IP) network. The corresponding network node comprises a swapping table comprising swapping records. Each swapping record lists an incoming network path and an associated QoS Class, an outgoing network path associated with the incoming network path. Each swapping records also lists a second QoS Class and an output port of the network node associated with the outgoing network path. A plurality of packet queues for storing packets from incoming packet flows are present in the network node. Each packet queue has an associated QoS classification.

The network node also comprises a communication module capable of receiving one of the incoming packet flows on one of the incoming network paths and directing the received packets from the incoming packet flow into one of the packet queues having the associated QoS classification corresponding to the QoS Class of the outgoing network path associated with the incoming network path on which the packets have been received, and as listed in the swapping table.

Another aspect of the present invention is to provide a method for having Quality of Service (QoS) mechanism on a network path in an Internet Protocol (IP) network. The corresponding network path has at least one network node thereon. The method comprises steps of receiving at the network node a packet flow on the network path. Identification of at least one QoS requirement associated with the packet flow is then performed. After identification of a destination to the packet flow, a routing table of the network node is used to verify that at least one best path toward the destination meets the at least one QoS requirement. If the best path toward the destination meets the at least one QoS requirement, an Information_request message is sent on at least one output port of the network node toward at least one target node. After reception at the network node of receiving at least one Information_reply message from the one target node in response to the Information_request message, identification of the best path to be used is done. The packet flow is then forwarded from the network node on the identified best path.

It is yet another aspect of the present invention to provide a method for implementing a Quality of Service (QoS) mechanism for transiting packet flows between a first network node and a second network node in an Internet Protocol (IP) network. Each packet flow has at least one QoS requirement associated therewith. The IP network also comprises at least another network node and network paths connecting two of the network nodes together. Each packet flows transits from the first network node on one of the network paths up to the at least another network node and on one other of the network paths up to the second network node. The method comprises steps of identifying a problem with transiting one of the packet flows. After identification of the problem, the first network node sends a Status_request message on the one of the network paths connected thereto toward the second network node. When the at least another network node receives the Status_request message, it fills it with availability information extracted from its port table. When the Status_request reaches the second network node, it processes the availability information contained therein into a Class_assignment message before forwarding the Class_assignment message on the one other of the network paths connected thereto toward the first network node.

BRIEF DESCRIPTION OF THE DRAWINGS

A more complete understanding of the present invention may be had by reference to the following Detailed Description when taken in conjunction with the accompanying drawings wherein:

FIG. 5 is a table showing an example of end-to-end delay requirement associated with a packet flow;

FIG. 6 is a table showing an example of routing delays associated with a plurality of QoS classes;

FIG. 7 is a table showing an exemplary list of possible trajectories with their associated end-to-end delay result for a packet flow with respect to a plurality of QoS classes across routers on a network channel in accordance with the present invention;

FIG. 11A is a routing table of an end node in an Internet Protocol network in accordance with the present invention;

FIG. 11B is a port table of an entry node in an Internet Protocol network in accordance with the present invention;

FIG. 11C is a swapping table of a router in an Internet Protocol network in accordance with the present invention;

FIG. 11D is a routing table of a router in an Internet Protocol network;

FIG. 11E is a port table of a router in an Internet Protocol network;

FIG. 11F is a swapping table of a router in an Internet protocol network in accordance with the present invention;

FIG. 11G is a routing table of a router in an Internet Protocol network;

FIG. 11H is a port table of a router in an Internet Protocol network;

FIG. 11J is a swapping table of a router in an Internet protocol network in accordance with the present invention;

FIG. 12A is an Information_request message used in an extended distance vector algorithm in an Internet Protocol network;

FIG. 12B is an Information_reply message used in an extended distance vector algorithm in an Internet Protocol network;

FIG. 13A is a Status_request message used by the QoS mechanism;

FIG. 13B is Class_assignment a message used by the QoS mechanism;

FIG. 13C is a Explicit_request message used by the QoS mechanism;

FIG. 15 is a modular representation of a network node deploying a Quality of Service (QoS) mechanism in an Internet Protocol (IP) network in accordance with the present invention;

DETAILED DESCRIPTION OF THE PREFERRED EMBODIMENTS

The present invention relates to a Quality of Service (QoS) mechanism in an Internet Protocol (IP) network and to a method for performing the QoS mechanism. The existing QoS solutions do not provide efficiency and scalability as does the QoS mechanism of the present invention. Moreover, the present invention provides a flexible architecture enabling a wider range of QoS needs to be answered. Another advantage of the flexible architecture is availability of fast and simple traffic forwarding mechanism throughout the IP network. In the following discussion, the term network node is used to describe a router or any other network resource having routing capabilities. This includes an entry node or an exit node.

In the following discussion, the term bandwidth is used to describe capacity, measured in bit per second rather than a frequency spectrum. The term packet is used to describe a unit of traffic sent from a network source (node or user) to a network destination (node or user). In that sense, a packet flow is a stream of packets not necessarily constant in time, the packets possibly having different sizes. A reception of the packet flow, in the present context, means the reception of the first packet in the stream of packets. Any other action performed on the packet flow, unless explicitly stated, means that all packets pertaining to the same packet flow are treated. For instance, forwarding the packet flow means forwarding each and every packet from the packet flow as they reach the forwarding node or possibly from a given packet queue. In the present context, the packet queue is a means used in network apparatus to orderly store the received packets before they are forwarded toward their destination. It should also be noted that the term network interface is used for a hardware component in a network apparatus enabling communication on a link. The term port is used to represent the logical component enabling packets to be sent on a network interface. Multiple ports may use one network interface. The link is a connection (wired or not) toward another network apparatus.

Figure 8:
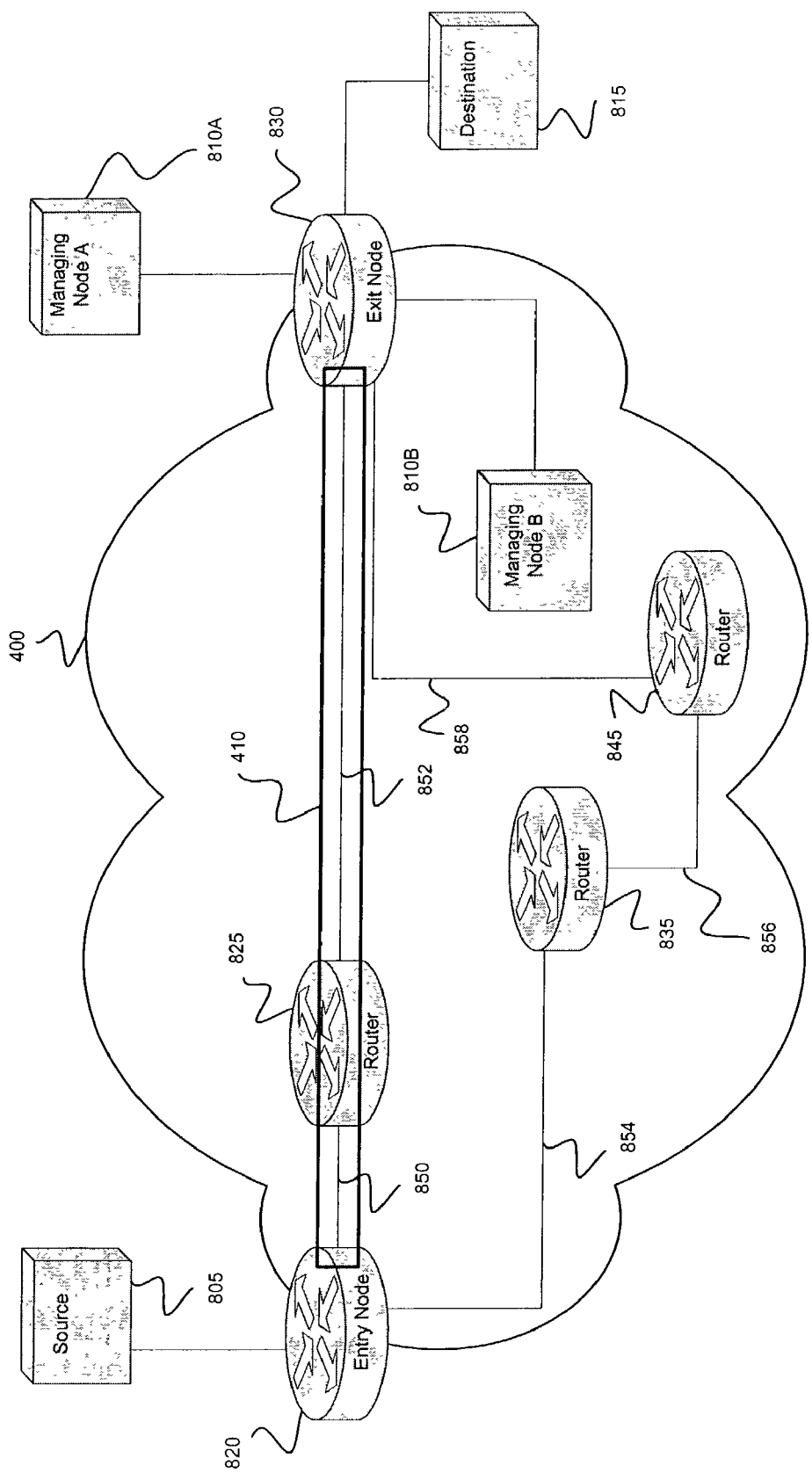
FIG. 8 is a schematic representation of a plurality of nodes deploying a Quality of Service (QoS) mechanism on a network channel in an Internet Protocol (IP) network.

Reference is now made to the drawings where FIG. 8 depicts an exemplary schematic representation of a plurality of network nodes deploying a Quality of Service (QoS) mechanism on a network channel 410 in an Internet Protocol (IP) network 400. The network channel 410 is bounded by an entry node 820 and an exit node 830. The entry node 820 and the exit node 830 may be referred to as end nodes when the given explanation applies to both of them. The deployment of the QoS mechanism requires at least one router 825 on the network channel 410. Router 835 and 845 are also shown off the network channel 410, but still in the IP network 400. FIG. 8 only shows one router 825 on the network channel and one network channel 410, but it should be understood that this only represents the minimum requirement in order for the QoS mechanism to be deployable in the IP network 400. The IP network 400 is normally composed of several routers 825, 835 and 845 and several different network channels 410, where on each network channel 410 there may be several routers.

The network channel 410 is established between the entry node 820 and the exit node 830 for transit of at least one packet flow (not shown) over the IP network 400 from a source 805 to a destination 815. The source 805 and the destination 815 can be either located inside or outside the IP network 400. The entry node 820 receives the packet flow from the source 805 and forwards it on the network channel 410 toward the exit node 830. The exit node 830 connects with the destination 815 and forwards the packet flow received on the network channel 410 thereto. A managing node 810(A or B) for managing the QoS mechanism is connected to one of the end nodes. The managing node 810 can be located inside the IP network 400 (managing node 810B) or outside the IP network 400 (managing node 810A). Moreover, the managing node 810 can be co-located (in the same location) or not with one of the end nodes.

Each packet flow reaching the entry node 820 has associated therewith at least one QoS requirement for its transit over the IP network 400. The network channel 410 is established in accordance with the requirements. The requirements are associated with the packet flow because, among other possibilities, a Service Level Agreement (SLA) exists between, as an example, the source 805 and the entry node 820. The SLA could also exist between the source network's operator and the IP network's 400 operator or between the destination network's operator and the IP network's 400 operator. Another possibility for associating the packet flow with the requirements is that a recognized type of traffic is associated with the packet flow. For instance, the requirements could be the same for all packet flows pertaining to multimedia conferences. Identification of the type of traffic can be done by looking at each packet from the packet flow for specific information, for instance, in its header. Yet another possibility to associate the packet flow with the requirements is that the source 805 sends a traffic specification request. The traffic specification request is compliant with the teachings of the IETF RFC 2210 and contains all the requirements for the packet flow. In other words, the QoS requirements are issued in the traffic specification request by the application that generates the packet flow toward the entry node 820. The following is an exemplary list of QoS parameters that can be specified in the traffic specification request. It should be understood that other not mentioned parameters can be specified.

QoS requirements (required level of QoS to be met):
 1. maximum data loss probability;
 2. maximum delay-jitter;
 3. minimum bandwidth;
 4. maximum cost;
 5. maximum end-to-end delay.
Network parameters related to the QoS requirements:
 1. data loss probability;
 2. delay-jitter;
 3. bandwidth;
 4. cost;
 5. end-to-end delay;
 6. generic network metric.

Figure 1:
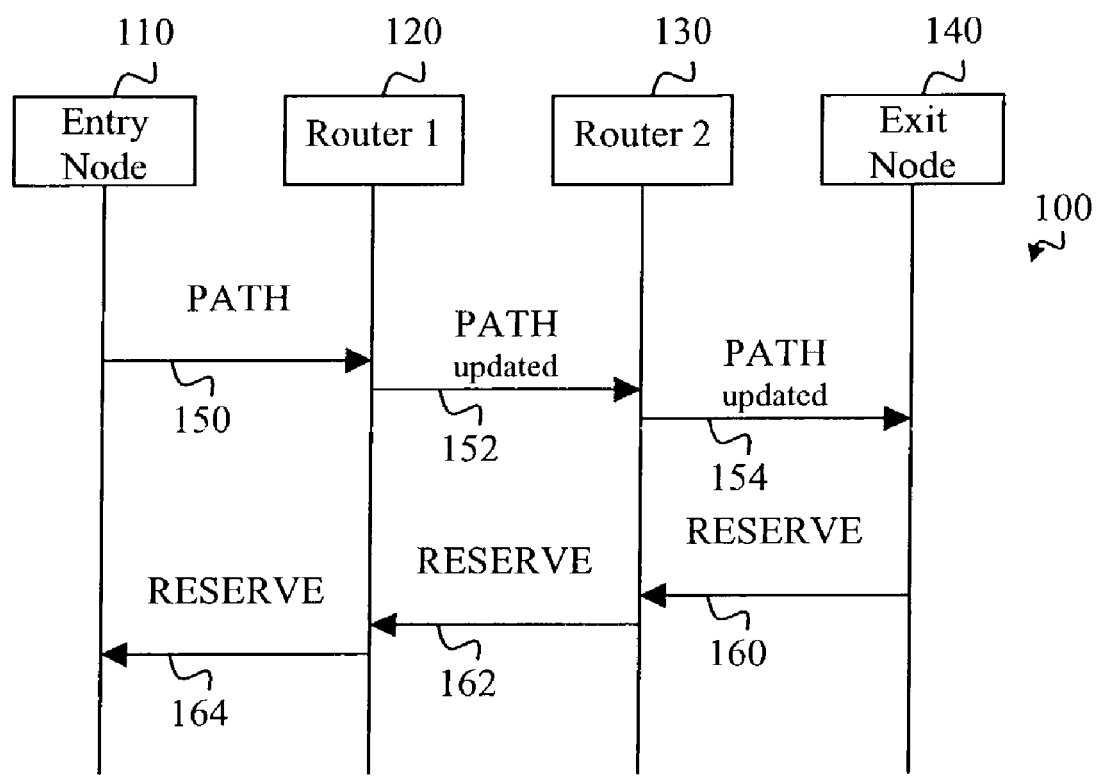
FIG. 1 is a signal flow chart of a deployment of an Integrated Services (Int-Serv) path according to prior art.
Figure 2:
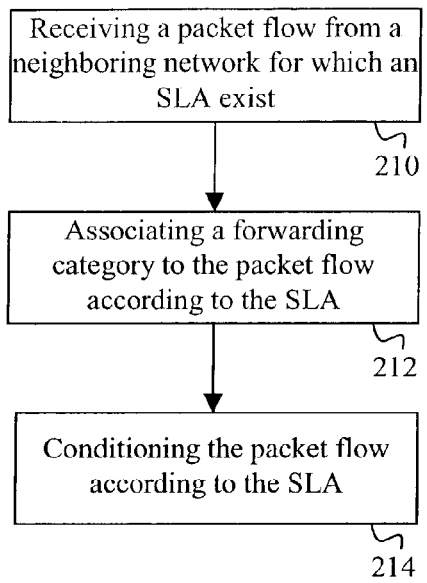
FIG. 2A is a flow chart of a reception of a packet flow in an entry node implementing Differentiated Services (Diff-Serv) according to prior art.
FIG. 2B is a flow chart of a forwarding of packets in an internal node implementing Differentiated Services (Diff-Serv) according to prior art.
Figure 2:
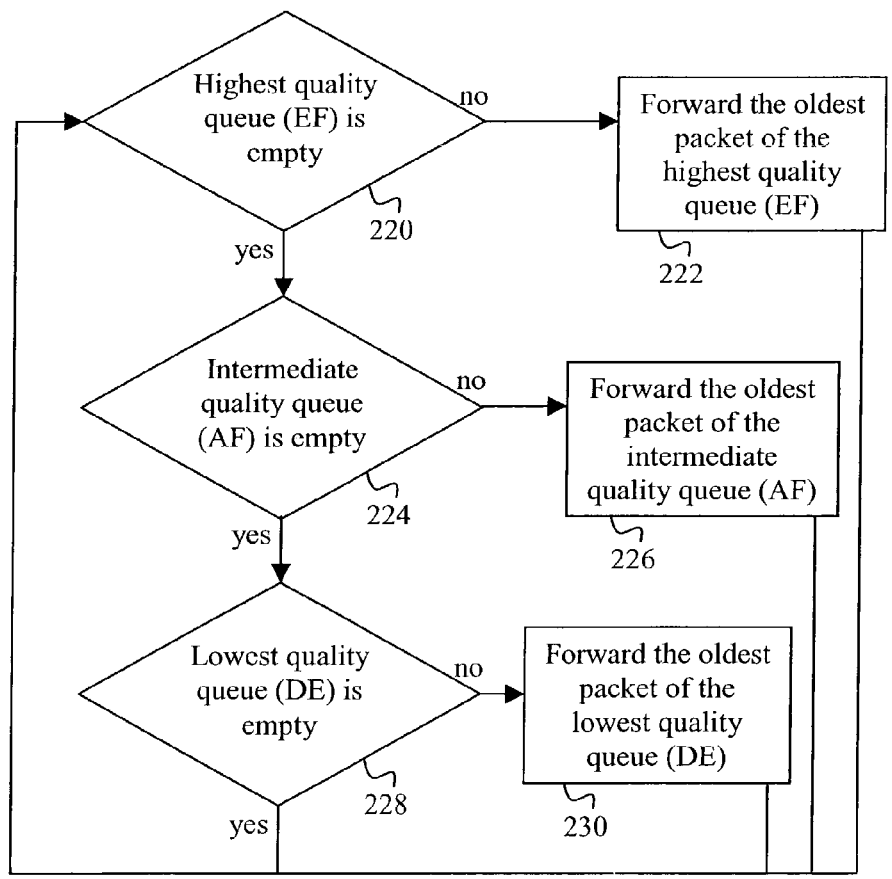
Figure 3:
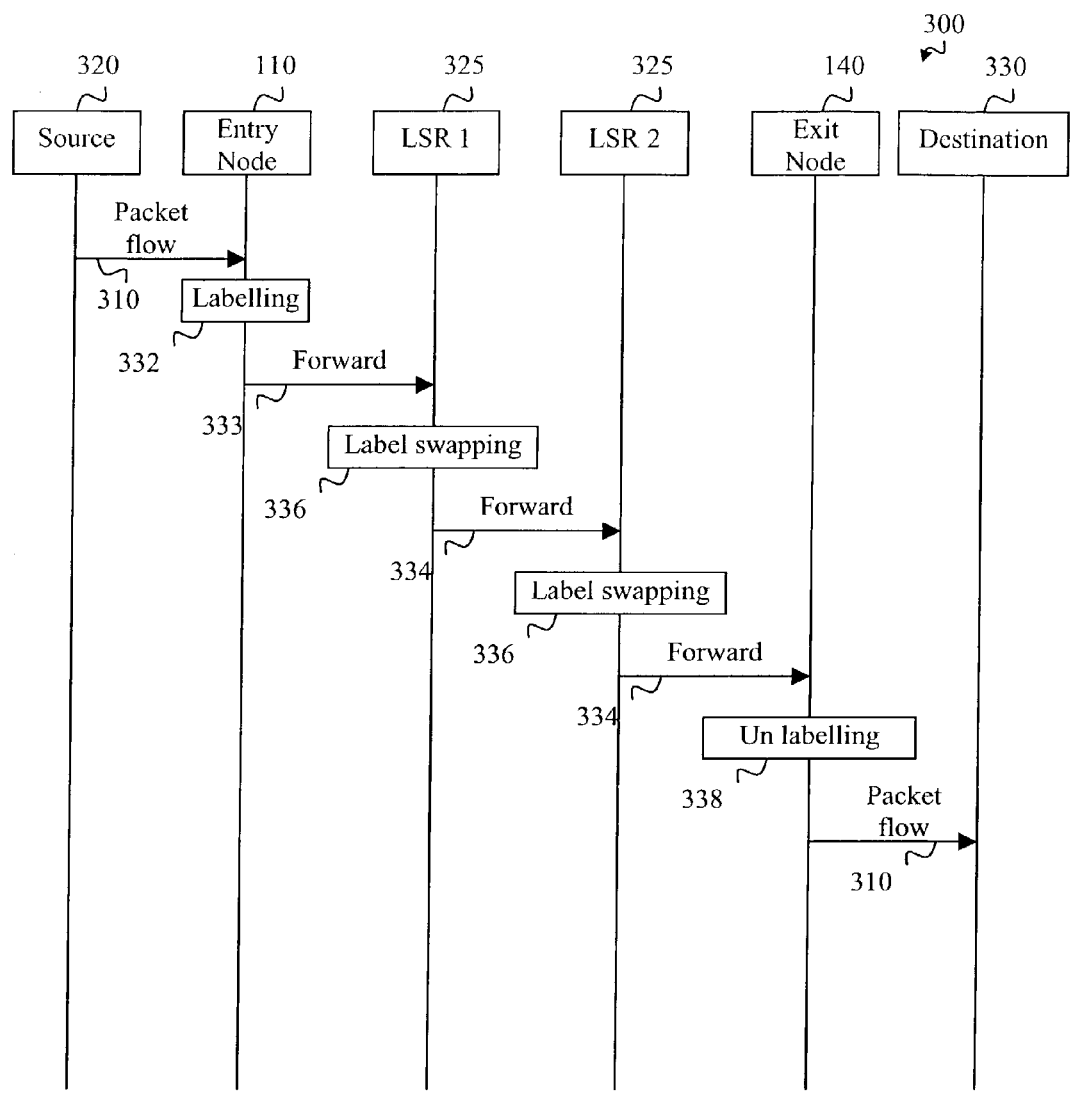
FIG. 3 is a signal flow chart of a Multiple Protocol Label Switching (MPLS) network handling a packet flow according to prior art.
Figure 4:
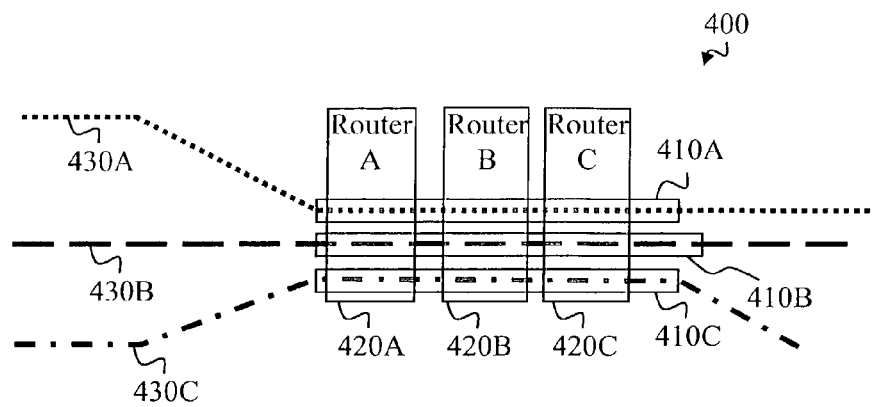
FIG. 4A and FIG. 4B depict an exemplary Quality of Service (QoS) mechanism on a network channel in an Internet Protocol (IP) network in accordance with the present invention.
Figure 4:
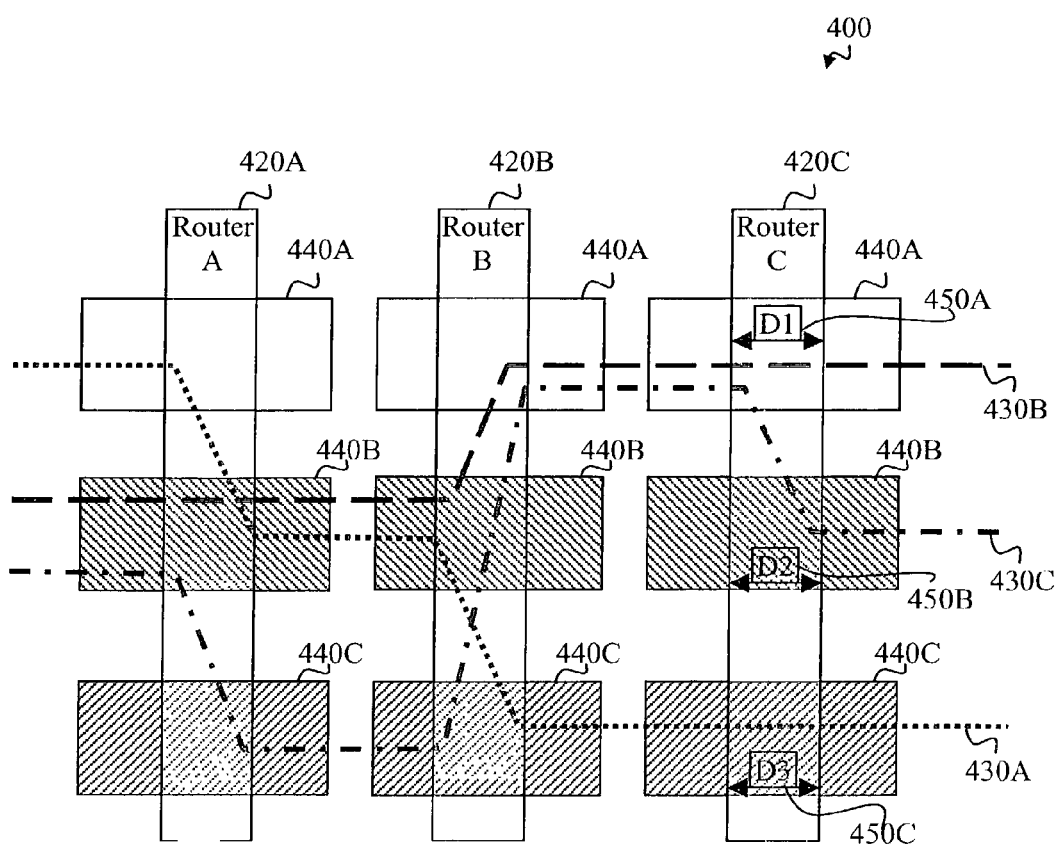

Reference is now concurrently made to FIG. 8 and FIG. 4A and 4B. FIGS. 4A and FIG. 4B together depict the QoS mechanism in the IP network 400. FIG. 4A and FIG. 4B may be referred to together as FIG. 4. The IP network 400 is represented on FIG. 4A and in more details on FIG. 4B to better show the QoS mechanism. Network channels 410(A to C) passing through routers 420(A to C) enable transit of packet flows 430(A to C) from the source 805 to the destination 815. It is quite common to have a plurality of packet flows 430 transiting over each of the network channels 410, but only one packet flow 430 per network channel 410 is shown to ensure readability of the Figure. It should also be noted that, in the Figures, three network channels 410, three routers 420 and three packet flows 430 are represented for clarity purposes. However, the IP network 400 could contain numerous network channels 410 and routers 420 through which packet flows 430 transit.

As mentioned previously, each of the packet flows 430 are associated with QoS requirements. Therefore, the network channels 410 are established to ensure that the QoS requirements are met. In the current example, the QoS requirements are an end-to-end delay requirement. The end-to-end delay for one of the packet flows 430 equals the summation of routing delays 450(A to C) caused by the routers 420(A to C) on the network channel 410. The value of one routing delay 450 is the time taken by one router 420 for transiting one packet flow 430. The value of one routing delay 450 depends on QoS classes 440(A to C) associated with the packet flow 430 when it arrives thereby. Three routing delays 450(A to C) are shown in router 420C, but it should be understood that each router 420 has corresponding routing delays associated with each one of the QoS classes 440. For doing so, each router 420 provides different QoS classes 440. In the example depicted in FIG. 4, the routers 420 use three QoS classes 440(A to C), but the routers 420 are not limited to this number of QoS classes 440.

FIG. 5 shows an example of end-to-end delay requirements (in milliseconds (ms)) associated with the packet flows 430 according to the IP network topology shown in FIG. 4. In the example, packet flows 430A, 430B and 430C have respective end-to-end requirements of 35 ms, 37 ms and 32 ms.

FIG. 6 shows an example of maximum routing delays (in ms) for each router 420 associated with the plurality of QoS classes 440 in accordance with FIG. 4. In the example, QoS classes 440A, 440B and 440C have respective associated routing delays D1 450A, D2 450B and D3 450C of 5 ms, 10 ms and 15 ms.

The QoS mechanism of the present invention uses different QoS classes 440 within the same network channel 410 in order to reach the end-to-end delay requirement associated with each packet flow 430. The QoS mechanism enables promotion and demotion of each packet flow 430 between the plurality of QoS classes 440 while it transits on the network channel 410. An example of the promotion of the packet flow 430B is shown in the router 420B in FIG. 4. In fact, the packet flow 430B enters the router 420B in the QoS class 2 440B and exits the router 420B in the QoS class 1 440A. It is referred to as a promotion since the QoS class 1 440A has a shorter routing delay than the QoS class 2 440B. An example of the demotion of the packet flow 430C is shown in the router 420A where the packet flow 430C enters the router 420A in the QoS class 2 440B and exits the router 420A in QoS class 3 440C. The promotion and demotion mechanisms will be described in greater details further on.

Reference is now concurrently made to FIG. 8, FIGS. 4A and 4B and FIG. 7. FIG. 7 shows an exemplary list of possible trajectories with their associated end-to-end delay result for the packet flow 430C with respect to the plurality of QoS classes 440 across each of the routers 420 on the network channel 410A. The trajectories that meet the end-to-end requirement shown in FIG. 5 for the packet flow 430A are shown in underlined bold font on FIG. 7. The selected trajectory as shown in FIG. 4 for the packet flow 430A is indicated by a triple border around the corresponding QoS classes 440 across each of the routers 420 on the network channel 410A.

In a typical implementation, the network channel 410 is formed by several networks paths 850 and 852 connecting the various network nodes of the network channel 410 together. The network channel 410 is typically an extended MPLS path. Thus, network path 850 and 852 each have an associated label. The following example is taken with the network node 825 being the reference point. In order to implement an extended MPLS algorithm, each network node of the network channel 410 should have a swapping table. The swapping table contains one swapping record for each of the network path 850 or 852 connected thereto. While the traffic on a given network path is typically bi-directional, the general direction of the flow is indicated by the designation of incoming or outgoing network path with the network node for reference. Each swapping record associates a label for each incoming network path 850 connected thereto with a label for a corresponding outgoing network path 852. Each swapping record also associates an output port of the network node 825 to the outgoing network path 852. In order for the QoS mechanism to be implemented, each swapping record also associates one of the QoS Classes 440 to each of the incoming path 850 and outgoing path 852. In other words, instead of swapping only the label of the incoming network path 850 to the label of the outgoing network path 852, the current extended MPLS algorithm also swaps the QoS class 440(A, B or C) of the incoming network path 850 to the QoS Class 440(A, B or C) of the outgoing network path 852. FIG. 11F shows the swapping table of the network node 825 with the described network paths 850 and 852 and other network paths not shown on FIG. 8. A swapping table for the entry node 820 is shown in FIG. 11C and a swapping table for the router 835 is shown in FIG. 11J.

Figure 17:
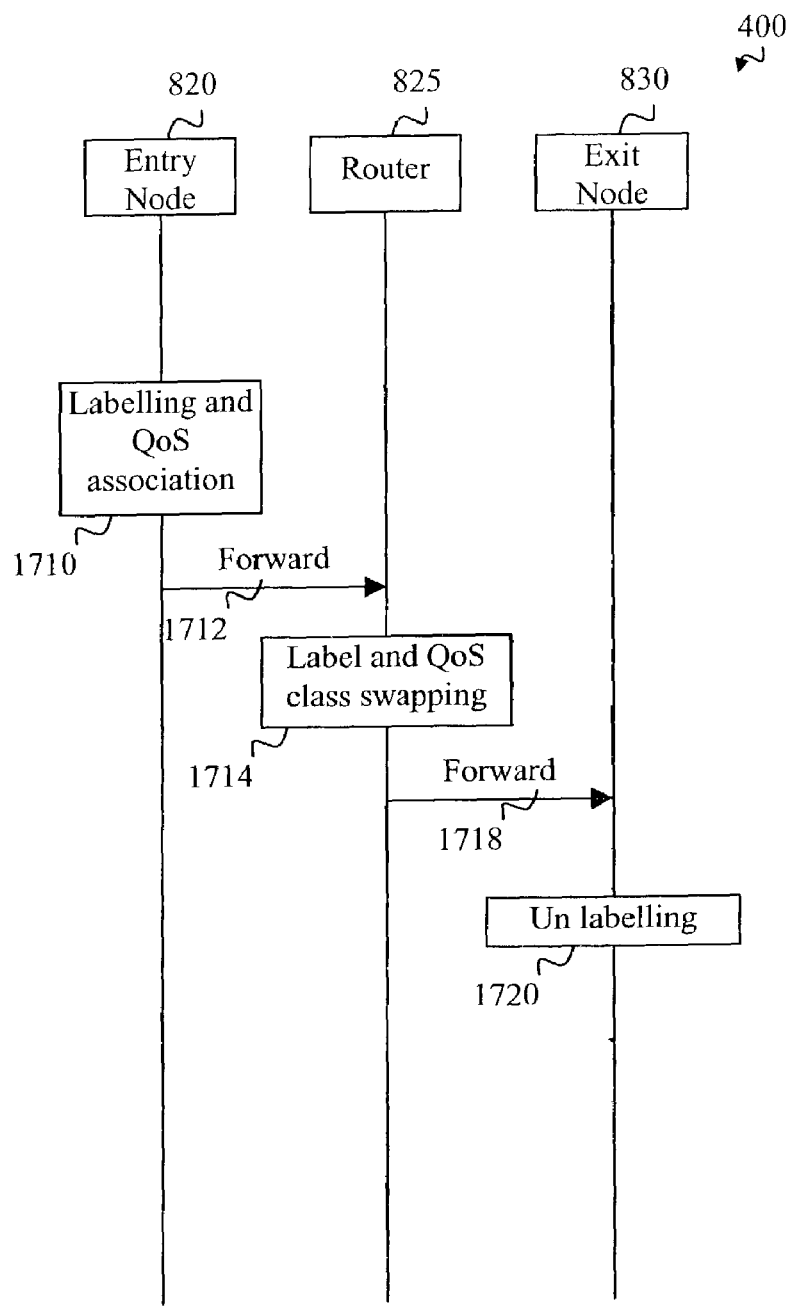
FIG. 17 shows an exemplary transit of a packet flow.

FIG. 17 shows an exemplary transit of a packet flow (not shown) from the entry node 820 to the exit node 830 through the router 825 on pre-established network paths. After reception from the source 805, the packet flow is labeled "850" and associated with a first QoS Class 1 440A (step 1710) at the entry node 820. The labeled packet flow is then forwarded 1712 on the network path 850 toward the router 825. After reception of the packet flow, the router 825 swaps the label and the QoS Class 1 440A (step 1714) in accordance with its swapping table. In the present example, the packet flow labeled 850 having the QoS Class 1 440A associated therewith is received at the router 825. In accordance with the swapping table shown on FIG. 11F, the outgoing path's label is swapped to "852" having the QoS Class 3 440C associated therewith. The packet flow is directed to output port "1". On the other hand, if the packet flow has "850" for label and is associated with the QoS Class 2 440B, the outgoing path's label would be "852" having the QoS Class 2 440B associated therewith. In this second case, the packet flow would still be directed to the output port "1".

After the label and QoS swapping (step 1714), the packet flow is forwarded 1718 toward the exit node 830 on the outgoing path 852. After reception at the exit node 830, the packet flow is unlabeled and forwarded toward its destination 815.

As it can be noted, the FIGS. 4, 5, 6 and 7 show an exemplary implementation of the QoS mechanism. While it helps understanding the finality of the invention, the example does not teach how each packet flow is assigned a QoS class 440 in each router 420 on the network channels 410. A more generic approach is to be discussed with explanations of the intelligence needed in order to implement the QoS mechanism in the IP network 400.

Referring now to FIG. 8, when the entry node 820 first receives one packet flow, it must perform necessary actions in order to establish the network channel 410. Two approaches can be used in order to establish the network channel 410. The first approach is to have the entry node 820 decide on the list of nodes the network channel 410 should traverse. While the present invention can use the first approach, a second approach of "hop-by-hop" network channel establishment is also described. In fact, the second approach has the advantages of being more flexible and putting less processing pressure on the entry node 820.

Reference is now concurrently made to FIGS. 9A and 9B, 10A, 10B, 10C and 10D, and FIG. 8. The hop-by-hop network channel establishment shown on FIG. 9A and FIG. 9B uses an extended distance vector algorithm presented in FIG. 10A, FIG. 10B, FIG. 10C and FIG. 10D to establish the network channel 410. The extended distance vector algorithm uses two tables in each network node in the IP network 400, which are a routing table and a port table. The routing table is a list of routing records for all possible destinations in the IP network 400. Each routing record associates each of the QoS Classes 440 of the node with a least cost value and a corresponding next node on one possible network channel 410 toward the exit node 830. Each routing record also gives a least delay value and a corresponding next node on the most efficient network channel 410 toward the exit node 830 in terms of delay. The routing tables are exchanged between neighboring nodes with well-known mechanisms.

The port table contains a list of port records for all QoS Classes 440 of the node associated with each network interface of the node. Moreover, each port record associates a cost and a delay value with each QoS Class 440—network interface couple. While the cost in the port table is usually entered manually, the delay can be calculated with the well-known time stamping mechanism. Another way of establishing the cost in the port table is to have its value linked to the loading state of the corresponding port, i.e. the amount of traffic transiting through the corresponding port.

An example of the routing table and the port table of the entry node 820 can be found in FIG. 11A and FIG. 11B. An example of the routing table and the port table of the router 825 can be found in FIG. 11D and 11E. FIG. 11A, FIG. 11B, FIG. 11C, FIG. 11D, FIG. 11E and FIG. 11F may be referred to together as FIG. 11.

Figure 9A:
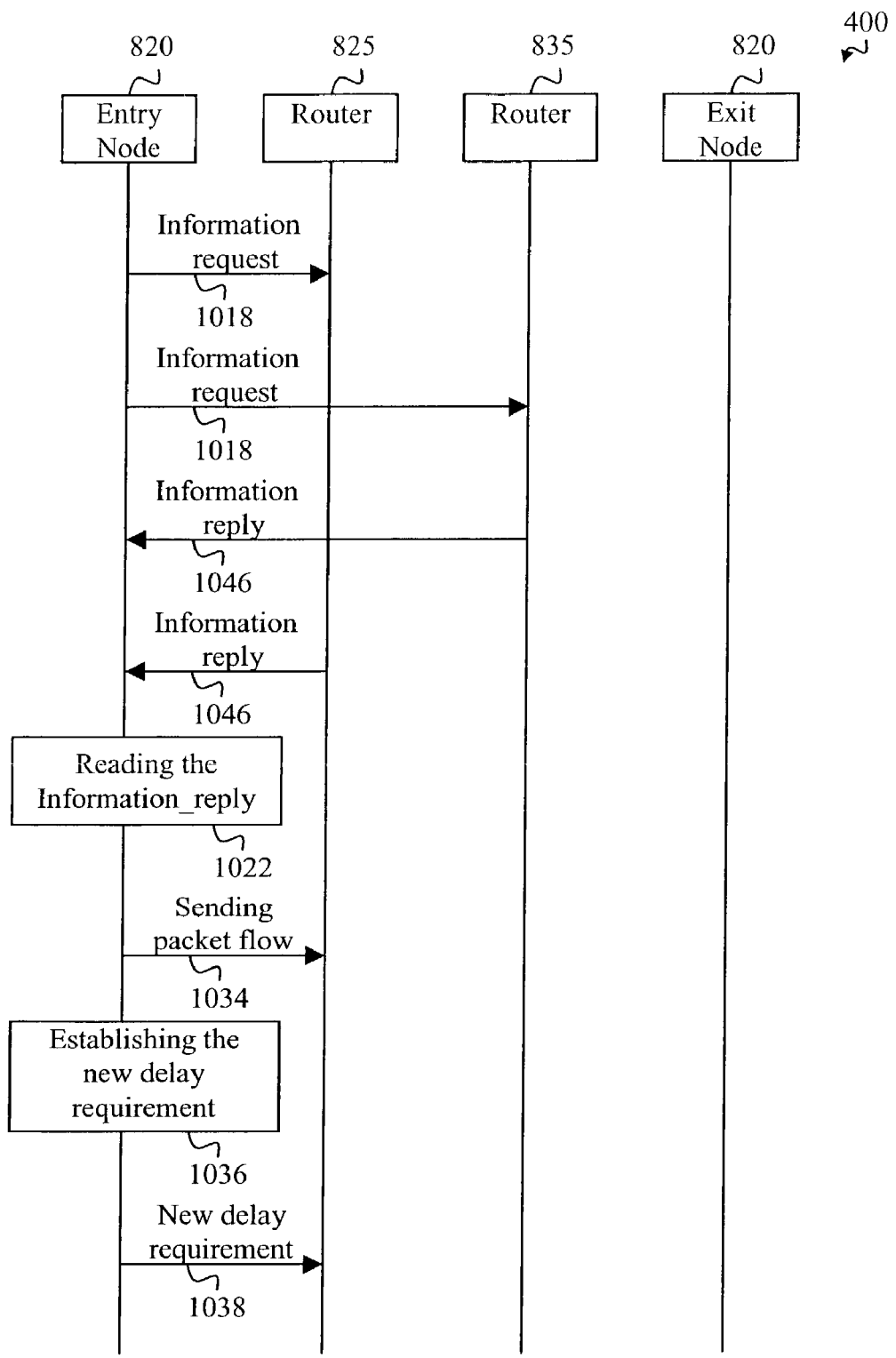
FIGS. 9A and 9B are a signal flow chart of a Quality of Service (QoS) mechanism on a network channel in an Internet Protocol (IP) network.
Figure 9B:
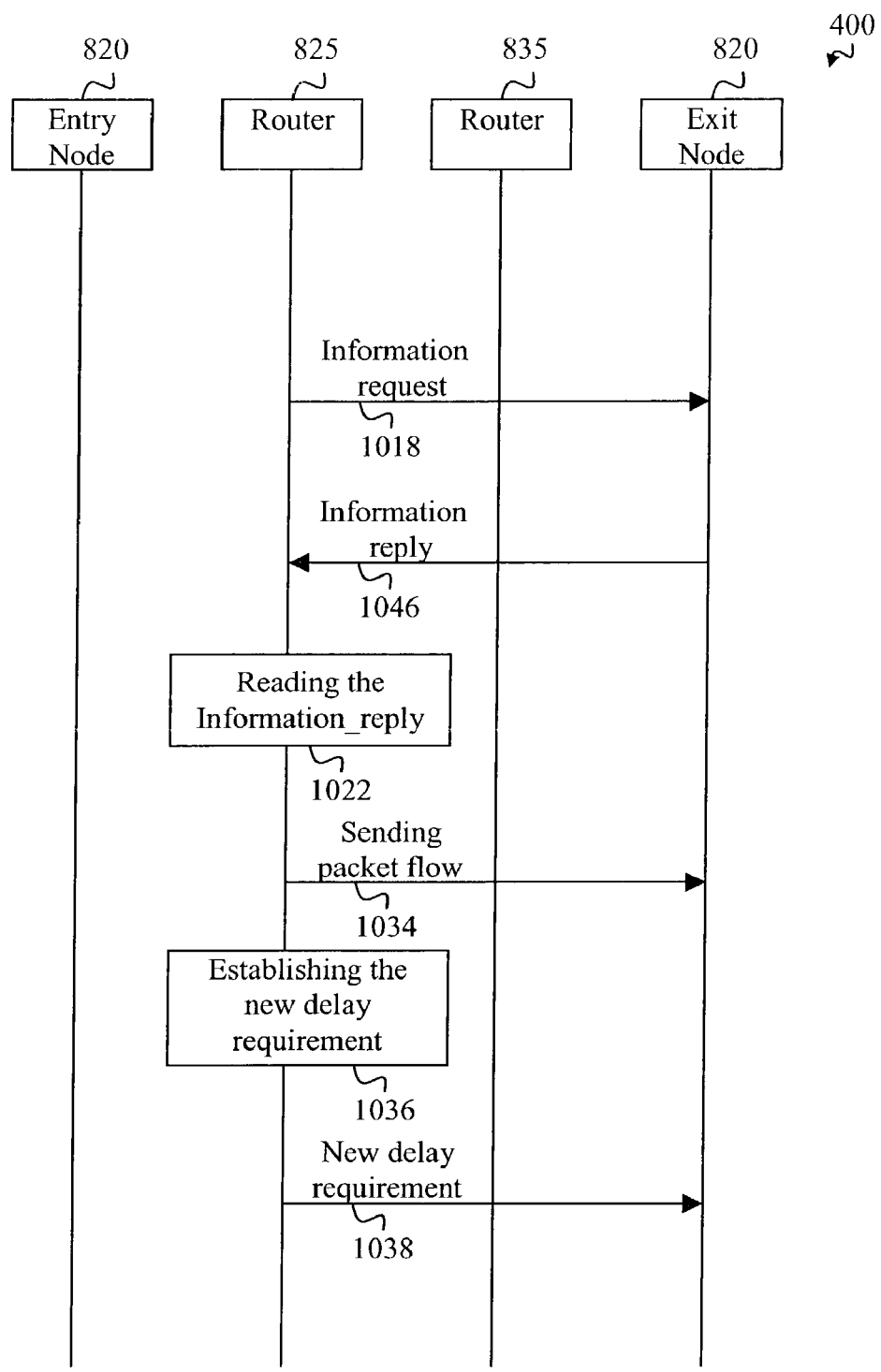
Figure 10:
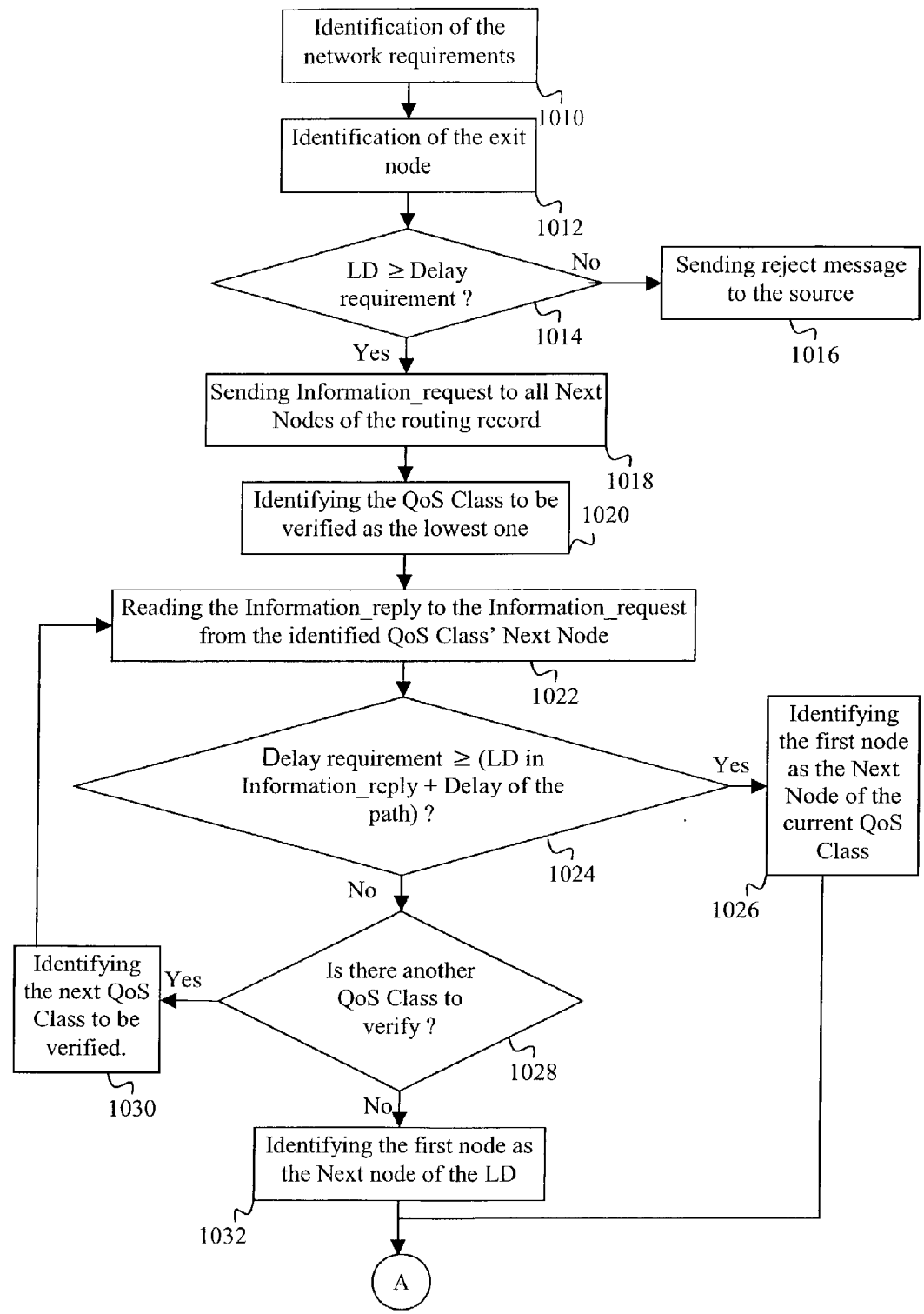
FIGS. 10A and 10B are a flow chart of an extended distance vector algorithm deployed in an Internet Protocol network.
FIG. 10C is a flow chart of a response to Information-request sent to a router in an Internet Protocol network.
FIG. 10D is a flow chart of an update of a routing table in a node in an Internet Protocol network.
Figure 10:
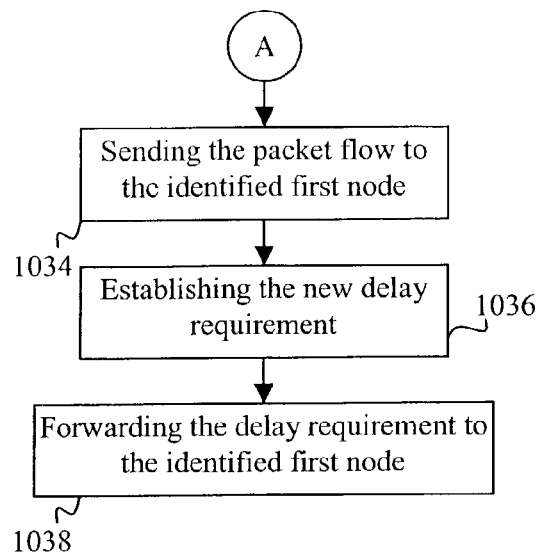
Figure 10:
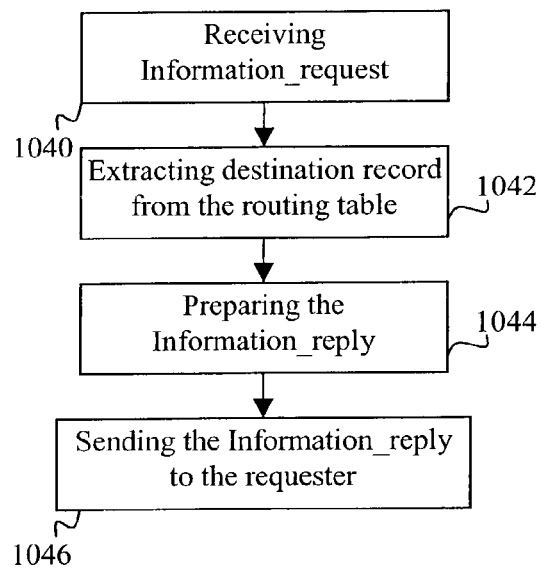
Figure 10:
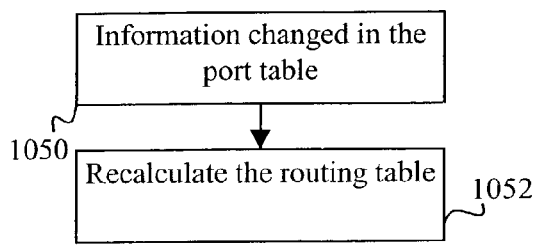
Figure 14A:
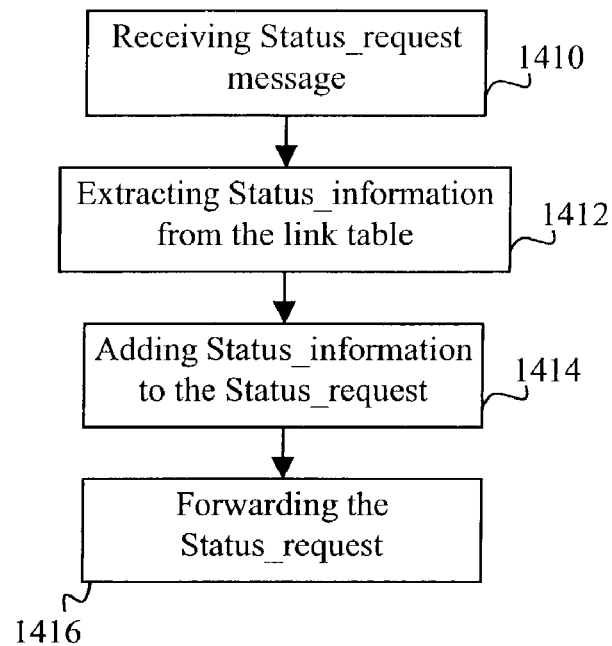
FIG. 14A is a signal flow chart of a response to a Status_request message in a network node in an Internet Protocol network.
Figure 14B:
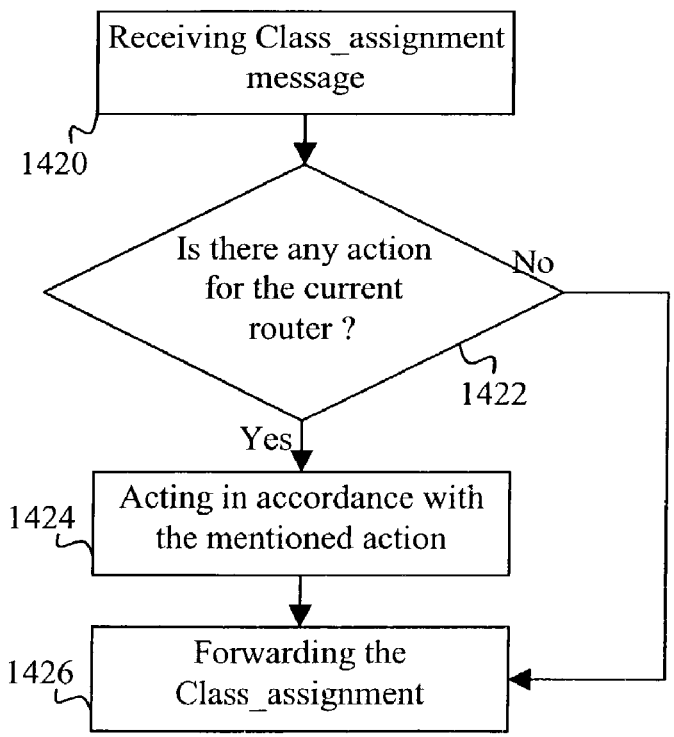
FIG. 14B is a signal flow chart of a response to a Class_assignment message in a network node in an Internet Protocol network.
Figure 16:
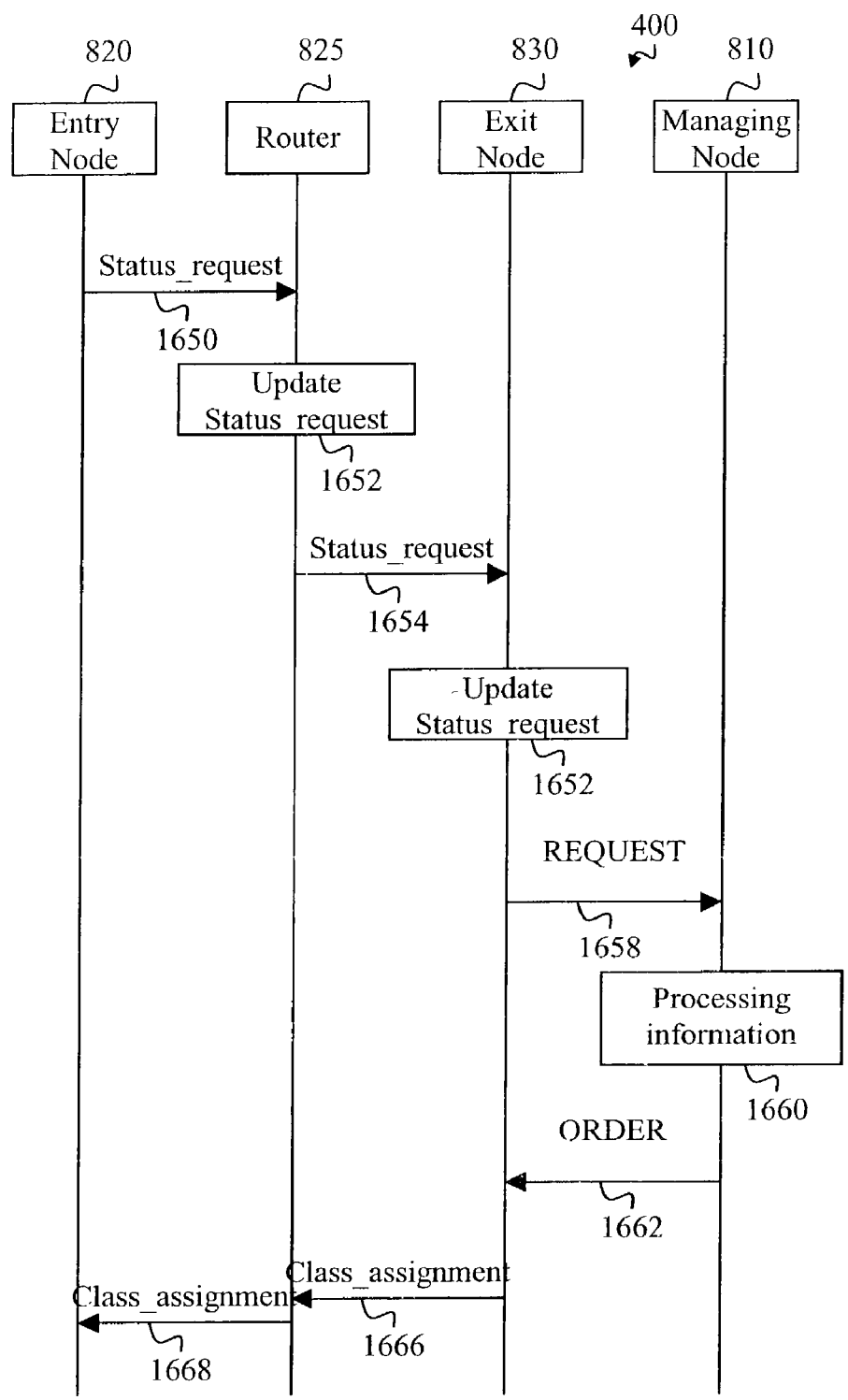
FIG. 16 is a signal flow chart of messages and steps for performing Quality of Service (QoS) mechanism on a network channel in an Internet Protocol (IP) network in accordance with the present invention.

Reference is now concurrently made to FIG. 8, FIG. 10A and FIG. 10B and to FIGS. 9A and 9B. FIG. 10A, FIG. 10B, FIG. 10C and FIG. 10D may be referred to together as FIG. 10. FIGS. 9A and 9B may be referred to together as FIG. 9. In the following example, it is assumed that all routing tables and all port tables are updated for all nodes in the IP network 400. After reception of a packet flow (not shown) from the source 805, the entry node 820 identifies the QoS requirements (step 1010) and identifies the exit node 830 (step 1012) corresponding to the destination 815 of the packet flow. For the purpose of the present example, the following QoS requirements are associated with the packet flow:
1. maximum data loss probability: not specified;
2. maximum delay-jitter: not specified;
3. minimum bandwidth: not specified;
4. maximum cost: 12;
5. maximum end-to-end delay: 17.

The entry node 820 then looks for the routing record in its routing table (shown on FIG. 11A) having the exit node 830 as target node. The maximum end-to-end delay requirement of the packet flow is then verified (step 1014). If the maximum end-to-end delay requirement is greater than or equal to the least delay value of the routing record, a reject message is sent toward the source (step 1016). The reject message may indicate, among other things, the least delay value that can be met for the specified destination. In the present case, the end-to-end delay requirement of 17 ms can be met since the least delay value is 10 ms.

It would also be possible to use the same method to verify the maximum cost before going any further in the process. Since the present example is focused on the end-to-end delay requirement, such verification is not made. Other verification on other criteria could also be made assuming that the corresponding network characteristics are included in the routing table.

After confirmation that the end-to-end delay requirement can be met, the entry node 820 sends Information Request messages (step 1018) to all next nodes listed in the routing record for the exit node 830. Preferably, only one Information_request is sent per node even if it appears more than once in the routing record. In the present case, Information_requests are sent to the router 835 as it appears in the Next node column of the Least cost on QoS Class 3 440C and to router 825 as it appears in all other Next node columns. It should be noted that the only inspected records have the exit node 830 as target node.

The entry node 820 then identifies which QoS Class 440 has the lowest cost (step 1020) and waits for an Information_reply from the corresponding next node referred to as current next node. In the present case, the current next node is the router 835. When the Information_reply corresponding to the identified QoS Class 440 arrives, the entry node 820 reads its content (step 1022) and performs another end-to-end delay requirement verification (step 1024) with two delay values. The first one is a delay value of the port record of the port table corresponding to the current next node (the router 835). The first value in the present case is 15 ms. The second value is the least delay value read from the Information_reply from the current next node. This second value is, for the present example, 10 ms. If the end-to-end delay requirement is greater than or equal to the summation of the two values (step 1024), a first node on the network channel 410 is identified (step 1026) as the current next node. Otherwise, the entry node 820 checks if another Information_reply from another QoS Class 440 can be verified (step 1028). In the present example, the link delay value is 15 ms and the least delay value obtained in the Information_reply from the current next node is 10 ms. The summation gives 25 ms compared to the end-to-end delay requirement of 17 ms.

Since the end-to-end delay requirement is not greater than or equal to the summation, the entry node 820 checks for other possible verification (step 1028). If no other QoS Class 440 is present, the first node of the network channel 410 is identified as being the next node of the least delay value of the routing record (step 1032). In the present example, the QoS Class 2 440B is identified (step 1030). The same verification takes place with the router 825 being the current next node. Two new delay values are sought. The new link delay value is 10 ms and the new read least delay value is 5 ms. The summation is 15 ms, which is low enough, compared to the end-to-end delay requirement of 17 ms. Thus, the router 825 is identified as the first node of the network channel 410.

After the first node of the network channel 410 is identified, the packet flow is forwarded thereto (step 1034). The entry node 820 then prepares a new end-to-end delay requirement for the packet flow. For this purpose, the entry node 820 needs to extract a link delay value corresponding to the link and the identified QoS Class 440 toward the first node of the network channel 410. In the present example, the link delay value is 10 ms. The new end-to-end delay requirement is the end-to-end delay requirement from which the link delay value is subtracted (step 1036). The present example has 7 ms (17 ms–10 ms) as its new end-to-end delay requirement. The new end-to-end delay requirement is then forwarded to the first node of the network channel 410 (step 1038), which is the router 825 in the present case. It should be noted that the new end-to-end delay requirement could also be prepared and forwarded to the first node of the network channel 410 (step 1038) before the packet flow is forwarded thereto (step 1034).

When the router 825 receives the packet flow, it waits for the new end-to-end delay requirement and performs the same algorithm presented in FIG. 10A and FIG. 10B. The process continues until the packet flow reaches the exit node 830 where it is forwarded toward the destination 815.

FIG. 10C presents an algorithm that a node such as the router 825 performs on reception of the Information_request (step 1040). After having extracted a routing record corresponding to the requested information of the Information_request from its routing table (step 1042), the router 825 prepares the Information_reply (step 1044) and forwards the Information_reply toward the requester (step 1046).

FIG. 10D presents an algorithm that a node such as the entry node 820 performs after a modification of any information in its port table (step 1052). The entry node 820 performs a complete recalculation of all the values in its routing table (step 1052).

Another important aspect of the present invention is possible modification of the established network paths 850 and 852. A modification in the availability of a given router or in its characteristics can lead to such modification. For instance, if the router 825 is overloaded, the packet flow has to be redirected to meet the same QoS requirements. In the preceding example, the end-to-end delay requirement of 17 ms would be reached through the router 835 and the router 845 with all the nodes using the QoS Class 1 440A on network paths 854, 856 and 858 for a maximum end-to-end delay of 15 ms.

In order for the change to take effect, the entry node or the exit node has to take action. The action may be triggered by an Explicit_request message as shown on FIG. 13C sent from the overloaded router 825. It may also be triggered by calculating at one of the end nodes a value for a QoS parameter on the network channel 410 between the two end nodes corresponding to the associated QoS requirement. Calculating of the value at one of the end nodes enables identification that the QoS requirements associated to the packet flow are not met. At this point, the action taken by the end node is to send a Status_request message as shown in FIG. 13A toward the other end node. The Status_request message should contain at least one QoS parameter with a target value to be reached. In the case of the end-to-end delay requirement, the target value could be a number of milliseconds. Each network node receiving the Status_request message fills it with its own availability information. The availability information must first be extracted from the port table, which contains information about the corresponding QoS parameter. For instance, a port record would give the cost of a new network path with a different QoS Class 440, thus enabling calculation of the difference in cost of changing from the current QoS Class 440 to another. The calculation can be done on cost or on any other QoS parameter of interest.

When the filled-in Status_request message reaches the other end node, a Class-assignment message is issued therefrom toward the initial end node with specific instructions for each of the network nodes that need to modify their actual QoS class assignment on the network channel 410. The Class_assignment message, shown in FIG. 13B, is issued by extracting the availability information of the network nodes of the network channel 410 from the Status_request message and identifying which of them have to change their current class assignment. Since calculation of the difference in cost is done by the network nodes themselves, the end point only chooses the best choice or best combination for the target value to be met and puts the new class assignments in the Class_assignment message.

As another embodiment, the previously mentioned first approach to the network channel establishment can be used. The first approach is to have the entry node 820 decide on the list of nodes the network channel 410 should traverse.

The entry node 820 analyses a packet flow received from a source and identifies a destination 815 to the packet flow. With respect to information found in its routing table, the entry node 820 sends a PATH message toward the exit node 830. Since the network channel 410 is not yet established, the PATH message is addressed to the router 825 and contains the information in order to reach each node between the entry node and the exit node 830. As an example, addresses of the nodes could be an IP address (IPv6 or IPv4). As stated by prior art, the PATH message contains all necessary information to establish a state of the art network channel. For example, in the Resource ReSerVation Protocol (RSVP), it would contain following fields. The fields are listed in category and definition of each of them is given between parentheses.

session-attr (general attributes for the resource or path being reserved):
  a. name (name of the path);
  b. flags (RFC 3209, identify state information option);
  c. setup-pri (RFC 3209, own priority);
  d. holding-pri (RFC 3209, others priority)
session (general session information for the resource or path being reserved):
  a. end-point (reference or address of the exit node 830);
  b. tunnel-id (destination 815 IP address);
  c. ext-tunnel-id (exit node 830 address).
send-templ:
  a. sender (reference or address of the entry node 820);
  b. lsp-id (unique identifier of the resource or network path being reserved in the IP network 400).
next-hop (list of the next receiver(s) of the PATH message).

The PATH message contains QoS requirements for the packet flow. In order for the QoS mechanism to be implemented, the PATH message also contains information on available resource throughout routers the network channel 410 is to traverse. The information is gathered in the PATH message through at least one of following fields. The PATH message could also contain other fields. The information in those fields can also be referred to as availability information or availability information request.

Router "X" Resources (list of available resources in one given router):
  a. available bandwidth;
  b. data loss probability;
  c. cost;
  d. QoS Classes 440 (list of available classes and associated network parameters):
    class 440A:
      1. data loss probability;
      2. maximum delay-jitter;
      3. available bandwidth;
      4. cost;
      5. maximum delay.
    class 440B:
      1. data loss probability;
      2. maximum delay-jitter;
      3. available bandwidth;
      4. cost;
      5. maximum delay.

It is to be noted that the list of available classes and associated network parameters of the previous exemplary listing can be different from one router to another. For example, the router 825 has three packet queues with associated QoS class 440(A, B or C). In this particular case, the listing would show three QoS classes 440 (A, B and C) instead of the two represented up there. As mentioned earlier, each packet queue, as it is well known in the art, stores the received packets before they are forwarded toward their destination.

After reception of the PATH message, the router 825 gathers the necessary availability information in order to fill the fields of the PATH message. The router 825 then updates the PATH message by adding its availability information and modifying the "next hop" field typically by removing itself from the list. An updated PATH message is then forwarded in accordance with the "next hop" information.

When the exit node 830 receives the PATH message, it updates it with its own availability information and forwards it to a managing node 810 through a request message 1658. The request message 1658 contains availability information from all the compliant routers 825 the PATH message traversed. The managing node 810 then processes the availability information (step 1660) in order to issue an order message 1662 toward the exit node 830. Because the managing node can be co-located in the exit node 830, the request message 1658 and the order message 1662 might not be sent on any network link.

The exit node 830 then includes the order message 1662 in a reserve message that is sent toward the entry node 820. All necessary information to establish a state of the art network channel is included in the reserve message. For example, in the Resource ReSerVation Protocol (RSVP), the reserve message would contain the following fields. The fields are listed in category and definition of each of them is given between parentheses.

session-attr (general attributes for the resource or path being reserved):
  a. name (name of the path);
  b. flags (same as above);
  c. setup-pri (same as above);
  d. holding-pri (same as above);

session (general session information for the resource or path being reserved):
   a. end-node (reference or address of the entry node 820);
   b. tunnel-id (same as above);
   c. ext-tunnel-id (same as above);
send-templ:
   a. sender (reference or address of the exit node 830);
   b. lsp-id (RFC-3209, identifier of the path);
   c. prev-hop (reference or address of the node sending the reserve message);
   d. lih (RFC-3209, Logical Interface Handle);
   e. in-if (RFC-3209, incoming port identifier);
   f. out-if (RFC-3209, outgoing port identifier);
explicit-route:
   a. sender-tspec (RFC-3209, description of the packet flow to which the path reservation should apply);
   b. qos (QoS parameters descriptors);
   c. cdr (Committed Data Rate);
   d. pbs (Peak Burst Size);
   e. pdr (Peak Data Rate)
   f. mpu (Maximum Packet Unit);
   g. mtu (Maximum Transmittal Unit)
block-tspec: (RFC 3209, label space)
   a. psb (Path State Block) refresh timer: time-to-expire;
   b. psb (Path State Block) cleanup timer: time-to-expire;
   c. ref-count (RFC 3209, reference counter);
   d. LSP-handle (RFC 3209, setup session);
   e. Session (RFC 3209, session identification);

The reserve message contains the QoS class assignment information. The following is a field in the reserve message that contains the QoS class assignment information. The reserve message could also contain other fields. The reserve message can contain up to one entry per router on the network channel 410.

Router "X" Allocated QoS Class 440: QoS Classes 440 B

The reserve message contains one entry per router on the network channel 410. When the router 825 receives the reserve message, it processes the contained QoS class assignment information. The router 825 assigns one the packet queue to the corresponding packet flow, thus assigning a QoS class 440 to the packet flow. It then forwards the reserve message toward the node from which the PATH message was initially received. Establishment of the network channel 410 is done in the same way up to the entry node 820.

As mentioned earlier, a modification of the established network channel 410 can occur. For instance, any change in the availability of a given router or in its characteristics can lead to such modification of the established network channel 410. For instance, if the router 825 shuts down, the traffic has to be redirected with the same QoS requirements. In this particular case, the entry node 820 or the exit node 830 reacts by reprocessing the availability information taking into account the new situation and sends QoS class assignment information to the corresponding router on the network channel 410.

The preceding examples are described in the exemplary IP network 400, but it should be understood that the same approach could be applied to all types of Internet Protocol networks without affecting the essence of the present invention. Moreover, it should be understood that other QoS requirements can be used as a basis for the decision taken at each node of the IP network 400. It should be noted that the entry node 820 and the exit node 830 are both end nodes of the network channel 410. In general, both end nodes take roles of entry node and exit node depending on source and destination of a given packet flow.

The established network channel 410 is typically an extended MPLS path. Thus, each router on the network channel uses the well-known MPLS algorithm to forward subsequent packets from the packet flow toward the destination 815. However, other forwarding behaviors could be used without affecting the teachings of the present invention.

FIG. 15 is a modular representation of a network node for deploying a Quality of Service (QoS) mechanism in an Internet Protocol (IP) network. The network node comprises a plurality of packet queues 1516 for storing packets from incoming packet flows. In order to have a QoS Class 440 associated with each packet flow, each of the packet queues 1516 have an associated QoS classification corresponding to the QoS classes 440.

The network node also comprises a port table for maintaining port records for all output ports of the network node toward subsequent network nodes in the IP network 400. Each of the port records in the port table lists at least two QoS parameters for the corresponding output port. Examples of port tables can be found in FIG. 11B, FIG. 11E and FIG. 11H. As an example, each of the QoS parameters can be in following list:
   a network metric;
   a cost;
   a delay;
   a packet queue length;
   a bandwidth;
   a data loss probability; and
   a delayjitter.

The network node also uses a communication module 1512 for connecting with anyone of the subsequent network nodes in the IP network 400. This connection is performed through the corresponding output port. The communication module 1512 also receives incoming packet flows from on one of its ports. Since the received packet flow has an associated QoS class, the communication module 1512 directs the packets from the incoming packet flows into one of the packet queues 1516 for storage with regard to the QoS class of the received packet flow and the QoS classification of the packet queues 1516. The communication module 1512 of the network node also forwards the stored packets from the storing packet queue toward one of the subsequent network nodes on the corresponding output port.

It should be noted that the incoming packet flows can be received from an internal module of the network node. For example, an exchange of routing information between two network nodes can require the network node to put packets in its own packet queues 1516.

The network node can be on the network channel 410 and can act as a router thereon. In that case, the communication module 1512 performs other tasks including receiving an availability information request and responding to the availability information request. The response the availability information request is done by extracting at least one QoS parameter from the port table and adding it to the availability information request before forwarding the availability information request. If RSVP is used, the availability information request is likely to be in the PATH message and the availability information request is forwarded in accordance with its "next hop" field.

When the network node acts as a router its communication module 1512 receives QoS class assignment information. The communication module 1512 responds to it by assigning one of the packet queues 1516 to one of the incoming packet flows before forwarding the QoS class assignment information to a next node. The next node is, as explained earlier, is identified as the node form which the availability information request was received earlier in the process.

The network node may as well comprise a routing table composed of routing record for other network nodes on the network channel. Each of the routing record comprises at least one best path toward each of the other network nodes in the IP network 400. Each of those best paths is associated with at least QoS parameter. Examples of routing table are shown in FIG. 11A, FIG. 11D and FIG. 11G.

If no network channel is yet established in the IP network for transit of an incoming packet flow, the network node can perform necessary steps to participate in the hop-by-hop establishment of the network channel. For doing so, the network node is capable of identifying QoS requirement associated with the incoming packet flow and identifying a destination for the incoming packet flow. After identification of the destination, the network node verifies that at least one best path in its routing table toward the destination meets the QoS requirement.

If at least one best path toward the destination meets the QoS requirement, the network node sends an Information_request message on each of its output ports toward its neighboring network nodes. After reception of at least one Information_reply message in response to the Information_request message, the network node identifies the best path present in its routing table that is to be used for the incoming packet flow. The network node then forwards the incoming packet flow on the identified best path. The network node also forwards the QoS requirement on the same best path. If no best path toward the destination node meets the QoS requirement, the network sends a reject message toward the incoming packet flow's source.

The network node can also act as one of the two end nodes of the network channel 410. In this case, the network node further comprises a quality module 1510 for managing the QoS mechanism. The quality module 1510 is capable of receiving availability information forwarded on the network channel, processing the availability information into QoS class assignment information and sending the QoS class assignment information on the network channel toward the other end node.

The QoS class assignment information resulting form the processing can be viewed as a rule to be applied by the other network node on the network channel for the transit of the incoming packet flow through the router. The rule associates the incoming packet flow with one of the plurality of packet queues 1516, thus associating the QoS class of the packet queue to the packet flow.

The network node, through the communication module 1512, is further capable of detecting a modification in the port table and rebuilding the routing table to reflect the modification.

The innovative teachings of the present invention have been described with particular reference to numerous exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views, and the various elements depicted are not necessarily drawn to scale.

What is claimed is:

1. A network node for implementing a Quality of Service (QoS) mechanism in an Internet Protocol (IP) network, the network node comprising:

a plurality of packet queues for storing packets from incoming packet flows, each of the packet queues having an associated QoS classification;

a swapping table comprising swapping records, each of the swapping records listing an incoming network path and an associated QoS Class, an outgoing network path associated with the incoming network path, the outgoing network path having a second QoS Class associated therewith and an output port of the network node associated with the outgoing network path;

a communication module capable of:
receiving one of the incoming packet flows on one of the incoming network paths; and
directing the received packets from the incoming packet flow into one of the packet queues having the associated QoS classification corresponding to the QoS Class of the outgoing network path associated with the incoming network path on which the packets have been received, and as listed in the swapping table.

2. The network node of claim 1 where a plurality of the swapping records corresponds to one of the output ports.

3. The network node of claim 1 further comprising a port table comprising one port record for each of the output ports associated to one of the outgoing paths, each of the port records listing a plurality of QoS parameters for each of the corresponding output ports and a subsequent node associated with each of the output ports.

4. The network node of claim 3 where a plurality of the port records correspond to one of the output ports.

5. The network node of claim 3 where the communication module is further capable of detecting a modification in one of the port table or the swapping table and rebuilding a routing table to reflect the modification.

6. The network node of claim 1 where the communication module is further capable of forwarding the stored packets from the packet queues through one of the output ports associated to one of the outgoing paths, forwarding the stored packet being further based on the QoS classification associated therewith and on the swapping table.

7. The network node of claim 1 where at least one of the incoming packet flows is received from an internal module of the network node.

8. The network node of claim 3 where the plurality of QoS parameters comprises at least two of the following:
a network metric;
a cost;
a delay;
a packet queue length;
a bandwidth;
a data loss probability; and
a delay-jitter.

9. The network node of claim 1 where the network node further comprises a routing table, the routing table comprising a routing record for other network nodes of the IP network.

10. The network node of claim 9 where the routing record comprises at least one best path toward each of the other network nodes, the at least one best path being associated with at least one of the plurality of QoS parameters.

11. The network node of claim 10, further comprising a quality module for managing the QoS mechanism, the quality module being capable of:
receiving a Status_request message on one of the incoming paths;
processing the Status_request message into a QoS Class_assignment message; and sending the QoS Class_assignment message on one of the outgoing paths.

12. The network node of claim 11 where the Status_request message comprises at least one of the plurality of QoS parameters.

13. The network node of claim 11 where the QoS Class_assignment message comprises assigning one of the packet queues to the one of the incoming packet flows.

14. The network node of claim 3 where the communication module is further capable of:
receiving a Status_request, the Status_request comprising:
a list of network nodes to traverse;
at least one QoS parameter that needs improvement; and
an improvement value for each of the at least one QoS parameter;
responding to the Status_request by:
extracting a value of one of the plurality of QoS parameters listed in one of the port records corresponding to the at least one QoS parameter that needs improvement;
after extraction of the value, calculating a difference between the at least one QoS parameter that needs improvement and the value; and
after calculating the difference, filing the Status_request with the one of the plurality of QoS parameters listed in one of the port records and the difference; and
forwarding the Status_request to the next network node in the list of network nodes to traverse;
receiving a QoS Class_assignment message, the Class_assignment message comprising:
a list of network nodes to traverse; and
assignment of one of the packet queues to one of the incoming packet flows; and
responding to the QoS Class_assignment message by:
assigning the one of the packet queues to the one of the incoming packet flows; and
forwarding the QoS Class_assignment message to the next network node in the list of network nodes to traverse.

15. The network node of claim 1 where the network node further comprises a routing table, the routing table comprising a routing record for other network nodes of the IP network.

16. The network node of claim 15 where the routing record comprises at least one best path toward each of the other network nodes, the at least one best path being associated with at least one of the plurality of QoS parameters.

17. The network node of claim 16 where the communication module is further capable of:
identifying at least one QoS requirement associated with each of the incoming packet flows;
identifying a destination for each of the incoming packet flows; and
after identification of the destination, verifying that the at least one best path toward the destination meets the at least one QoS requirement.

18. The network node of claim 17 where the communication module is further capable of:
if the at least one best path toward the destination meets the at least one QoS requirement, sending an Information_request message on each of the output ports;

receiving at least one Information_reply message in response to the Information_request message;
after reception of at least, one Information_reply message, identifying the at least one best path to be used; and
forwarding each of the incoming packet flows on the identified at least one best path.

19. The network node of claim 17 where the communication module is further capable of sending a reject message if the at least one best path toward the destination node does not meet the at least one QoS requirement.

20. The network node of claim 17 where the step of forwarding the packet flow on the identified best path further comprises forwarding the at least one QoS requirement on the identified best path.

21. The network node of claim 17 where identifying the at least one QoS requirement further comprises one of the following steps:
analyzing an existing Service Level Agreement (SLA) with a source of one of the incoming packet flows;
receiving the at least one QoS requirement in a traffic specification request from the source; and
identifying a type of traffic associated with the at least one QoS requirement for each of the incoming packet flows.

22. A method for having Quality of Service (QoS) mechanism on a network path in an Internet Protocol (IP) network, the network path having at least one network node thereon, the method comprising steps of:
at the network node, receiving a packet flow on the network path;
identifying at least one QoS requirement associated with the packet flow;
identifying a destination for the packet flow;
after identification of the destination, verifying in a routing table of the network node that at least one best path toward the destination meets the at least one QoS requirement;
if the at least one best path toward the destination meets the at least one QoS requirement, sending an Information_request message on at least one output port of the network node toward at least one target node;
at the network node, receiving at least one Information_reply message from the at least one target node in response to the Information_request message;
after reception of the Information_reply from the at least one target node, identifying the best path to be used; and
forwarding the packet flow from the network node on the identified best path.

23. The method of claim 22 where the routing table comprises a routing record for other network nodes in the IP network.

24. The method of claim 23 where the routing record comprises the at least one best path toward the other network nodes, the at least one best path being associated with at least one of a plurality of QoS parameters.

25. The method of claim 24 where the plurality of QoS parameters comprises at least two of the following:
a network metric;
a cost;
a delay;
a packet queue length;
a bandwidth;
a data loss probability; and
a delay-jitter.

26. The method of claim 22 where the step of forwarding the packet flow on the identified best path further comprises forwarding the at least one QoS requirement on the identified best path.

27. The method of claim 22 where identifying the at least one QoS requirement further comprises one of the following steps:
   analyzing an existing Service Level Agreement (SLA) with a source the packet flow;
   receiving the at least one QoS requirement in a traffic specification request from the source; and
   identifying a type of traffic associated with the at least one QoS requirement for the packet flow.

28. A method for implementing a Quality of Service (QoS) mechanism for transiting packet flows between a first network node and a second network node in an Internet Protocol (IP) network, each of the packet flows having at least one QoS requirement associated therewith, the IP network comprising at least another network node and network paths connecting two of the network nodes, each of the packet flows transiting from the first network node on one of the network paths up to the at least another network node and on one other of the network paths up to the second network node, the method comprising steps of:
   identifying a problem with transiting one of the packet flows;
   at the first network node, sending a Status_request message on the one of the network paths connected thereto toward the second network node;
   at the at least another network node, filing the received Status_request message with availability information extracted from a port table;
   at the second network node, processing the availability information from the Status_request message into a Class_assignment message; and
   at the second network node, forwarding the Class_assignment message on the one other of the network paths connected thereto toward the first network node.

29. The method of claim 28 where the step of identifying a problem for transiting one of the packet flows comprises at least one step of
   receiving at the first network node an Explicit_request from the at least another network node;
   calculating at the first network node a value for a QoS parameter between the first and the second network nodes corresponding to the at least one QoS requirement associated to the one of the packet flows; and
   after calculating the value, identifying at the first network node that the at least one QoS requirement associated to the one of the packet flows is not met.

30. The method of claim 29 where the QoS parameters is one of the following:
   a network metric;
   a cost;
   a delay;
   a packet queue length;
   a bandwidth;
   a data loss probability; and
   a delay-jitter.

31. The method of claim 28 where the step of identifying a problem for transiting one of the packet flows comprises at least one step of
   receiving at the second network node an Explicit_request from the at least another network node;
   calculating at the second network node a value for a QoS parameter between the first and the second network nodes corresponding to the at least one QoS requirement associated to the one of the packet flows; and
   after calculating the value, identifying at the second network node that the at least one QoS requirement associated to the one of the packet flows is not met.

32. The method of claim 31 where the QoS parameters is one of the following:
   a network metric;
   a cost;
   a delay;
   a packet queue length;
   a bandwidth;
   a data loss probability; and
   a delay-jitter.

33. The method of claim 28 where the port table further comprises one port record for each output ports of the at least another network nodes associated to one of the network paths, each of the port records listing a plurality of QoS parameters for each of the corresponding output ports and a subsequent network node associated with each of the output ports.

34. The network node of claim 33 where a plurality of the port records corresponds to one of the output ports.

35. The method of claim 33 where the Status_request further comprises
   a list of network nodes to traverse toward the second network node;
   at least one QoS parameter that needs improvement; and
   an improvement value for each of the at least one QoS parameter.

36. The method of claim 35 where the step of filing the Status_request message with availability information extracted from the port table further comprises steps of:
   at the at least another network node, receiving the Status_request on the one other of the network paths;
   after reception of the Status_request, extracting a value of one of the plurality of QoS parameters listed in one of the port records where the output port of the one of the port records corresponds to the output port of the one other of the network paths;
   after extraction of the value, calculating a difference between the at least one QoS parameter that needs improvement and the value; and
   after calculating the difference, filing the status request with the one of the plurality of QoS parameters listed in one of the port records and the difference.

37. The method of claim 28 where the step of processing the availability information from the Status_request message into the Class_assignment message further comprises steps of:
   extracting the availability information from the Status_request;
   identifying which of the at least one network node is to change its current Class_assignment; and
   issuing the Class_assignment message toward the first network node.

38. The method of claim 28 where the Status_request message further contains information found in a ReSerVation Protocol—Traffic Engineering (RSVP-TE) PATH message.

39. The method of claim 28 where the Class_assignment message further contains information found in a ReSerVation Protocol—Traffic Engineering (RSVP-TE) RESERVE message.

* * * * *

UNITED STATES PATENT AND TRADEMARK OFFICE
CERTIFICATE OF CORRECTION

PATENT NO. : 6,968,374 B2
APPLICATION NO. : 10/187796
DATED : November 22, 2005
INVENTOR(S) : Yves Lemieux et al.

It is certified that error appears in the above-identified patent and that said Letters Patent is hereby corrected as shown below:

On the Title Page, Item (56) under "Other Publication", Line 6, delete "Woorking" and insert -- Working --, therefor.

In Column 1, Line 29, delete "pf", and insert -- of --, therefor.

In Column 1, Line 66, delete "hit-Serv", and insert -- Int-Serv --, therefor.

In Column 3, Line 57, delete "intepret", and insert -- interpret --, therefor.

In Column 5, Line 40, delete "Information-request", and insert -- Information_request --, therefor.

In Column 20, Line 3, in Claim 18, after "least" delete ",".

Signed and Sealed this

Twentieth Day of November, 2007

JON W. DUDAS
*Director of the United States Patent and Trademark Office*